United States Patent
Roberge et al.

(10) Patent No.: US 12,504,264 B2
(45) Date of Patent: Dec. 23, 2025

(54) METHOD AND SYSTEM FOR DETERMINING A SIMILARITY OR DISTANCE MEASURE BETWEEN BALLISTIC SPECIMENS

(71) Applicant: ULTRA ELECTRONICS FORENSIC TECHNOLOGY INC., St-Laurent (CA)

(72) Inventors: Danny Roberge, St-Bruno (CA); Alain Beauchamp, Montreal (CA); Serge Levesque, Lachine (CA)

(73) Assignee: LEADSONLINE, LLC, Plano, TX (US)

( * ) Notice: Subject to any disclaimer, the term of this patent is extended or adjusted under 35 U.S.C. 154(b) by 449 days.

(21) Appl. No.: 18/035,642

(22) PCT Filed: Nov. 4, 2021

(86) PCT No.: PCT/CA2021/051571
§ 371 (c)(1),
(2) Date: May 5, 2023

(87) PCT Pub. No.: WO2022/094713
PCT Pub. Date: May 12, 2022

(65) Prior Publication Data
US 2023/0408232 A1 Dec. 21, 2023

Related U.S. Application Data

(60) Provisional application No. 63/110,682, filed on Nov. 6, 2020.

(51) Int. Cl.
*F42B 35/00* (2006.01)
*G01B 11/30* (2006.01)
(Continued)

(52) U.S. Cl.
CPC ............ *F42B 35/00* (2013.01); *G01B 11/303* (2013.01); *G06T 7/0004* (2013.01); *G06V 10/761* (2022.01); *G06V 20/64* (2022.01)

(58) Field of Classification Search
CPC ..... F42B 35/00; G01B 11/303; G06T 7/0004; G06V 10/761; G06V 20/64
See application file for complete search history.

(56) References Cited

U.S. PATENT DOCUMENTS

| | | |
|---|---|---|
| 6,785,634 B2 | 8/2004 | Bachrach et al. |
| 2003/0149543 A1 | 8/2003 | Bachrach et al. |

(Continued)

OTHER PUBLICATIONS

Dong et al., "Objective evaluation of similarity scores derived by Evofinder® system for marks on bullets fired from Chinese Norinco QSZ-92 pistols" (published in Forensic Science Research, Sep. 2019).*

*Primary Examiner* — Casey L Kretzer

(57) ABSTRACT

There are described methods and system for determining a similarity or distance measure between a first ballistic specimen and a second ballistic specimen. The method comprises acquiring topographic data from the first ballistic specimen and the second ballistic specimen of at least one region of interest; computing from the topographic data at least one similarity score s for the first ballistic specimen and the second ballistic specimen; determining a non-match probability measure of the similarity score for at least one parameter characterizing a macroscopic and/or microscopic feature of the topographic data, the non-match probability measure associating the first ballistic specimen and the second ballistic specimen to a different source; and correcting the similarity score by determining a corrected similarity score that yields a same value of the non-match probability measure as the similarity score for a reference value of the at least one parameter.

20 Claims, 22 Drawing Sheets

(51) Int. Cl.
*G06T 7/00* (2017.01)
*G06V 10/74* (2022.01)
*G06V 20/64* (2022.01)

(56) References Cited

U.S. PATENT DOCUMENTS

2006/0047477 A1 3/2006 Bachrach
2011/0298650 A1* 12/2011 Yapa ................. G01S 7/412
342/118

* cited by examiner

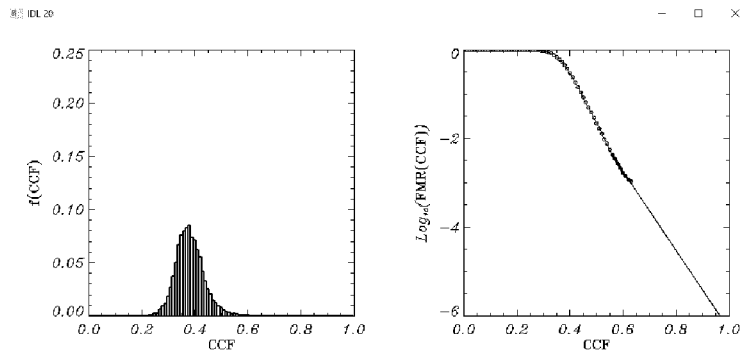
FIG. 13A    FIG. 13B
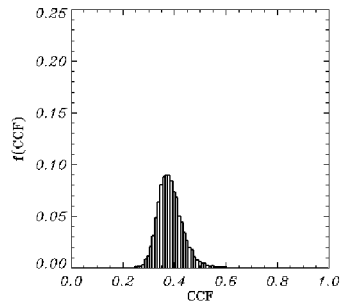 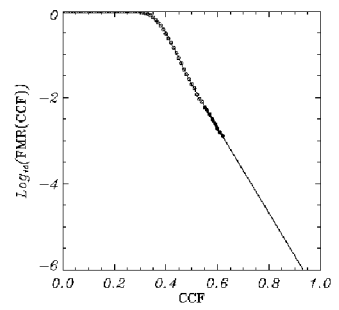
FIG. 13C    FIG. 13D
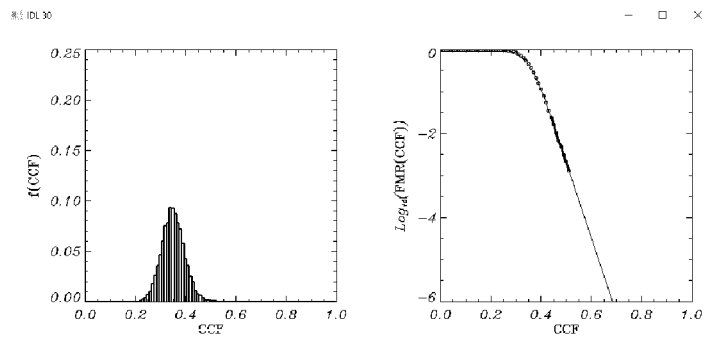
FIG. 13E    FIG. 13F
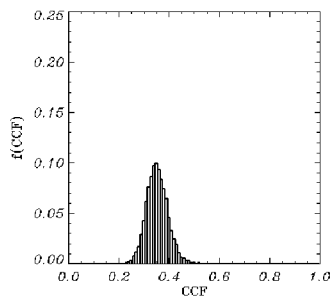 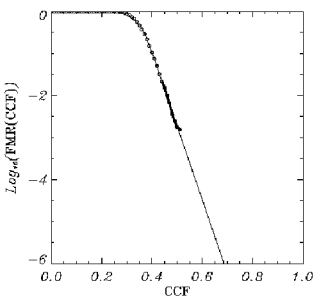
FIG. 13G    FIG. 13H

METHOD AND SYSTEM FOR DETERMINING A SIMILARITY OR DISTANCE MEASURE BETWEEN BALLISTIC SPECIMENS

CROSS-REFERENCE TO RELATED APPLICATIONS

The present application is a United States National Stage of International Application No. PCT/CA2021/051571, filed on Nov. 4, 2021, which claims the benefit of U.S. Provisional Patent Application No. 63/110,682 filed on Nov. 6, 2020, the contents of which are hereby incorporated by reference.

TECHNICAL FIELD

The present disclosure relates generally to comparing toolmarks of ballistic specimens for determining matches and non-matches.

BACKGROUND OF THE ART

The determination of whether or not two or more sets of firearm toolmarks were produced by a common or different source can be based on the qualitative similarity of optimally aligned toolmarks, as judged by an expert from his experience and training. High-resolution 3D microscopy provides a more quantitative approach, where similarity scores are based on high-resolution topographic measurements, and probabilities and error rates are computed through the statistical analysis of the distribution of the similarity scores under various conditions.

However, the statistical analysis of firearm toolmarks comes with challenges which have no equivalent in other forensic disciplines based on biometrics, such as fingerprints, DNA or iris patterns. Indeed, biometric features are known to be stable since childhood for any given individual, while firearms, as most man-made objects, evolve over time; they may even show inconsistent behaviors between successive firings. In addition, the markings, which result from the interaction between the surface of the ballistic specimen (such as a bullet or a cartridge case) and the inner surface or components of the firearm, are sensitive to a handful of characteristics of the firearm and the specimen. These characteristics come in a huge number of combinations: there are hundreds of calibers, firearm brands and ammunition manufacturers.

Therefore, improvements are needed.

SUMMARY

In a first broad aspect, there provided a method for determining a similarity or distance measure between a first ballistic specimen and a second ballistic specimen. The method comprises acquiring topographic data from the first ballistic specimen and the second ballistic specimen of at least one region of interest; computing from the topographic data at least one similarity score s for the first ballistic specimen and the second ballistic specimen; determining a non-match probability measure of the similarity score for at least one parameter characterizing a macroscopic and/or microscopic feature of the topographic data, the non-match probability measure associating the first ballistic specimen and the second ballistic specimen to a different source; and correcting the similarity score by determining a corrected similarity score that yields a same value of the non-match probability measure as the similarity score for a reference value of the at least one parameter.

In some embodiments, the reference value is a mean of the at least one parameter for a given type of ballistic specimen.

In some embodiments, the at least one parameter is at least one of a length L of the region of interest and a roughness R of a surface of the region of interest.

In some embodiments, the roughness R is an absolute profile slope between peaks and valleys of the region of interest.

In some embodiments, the similarity score is a maximum value of a cross-correlation function for a first profile X associated with the first ballistic specimen and a second profile Y associated with the second ballistic specimen.

In some embodiments, the similarity score is at least one of a pattern matching score (PMS) and a line counting score (LCS).

In some embodiments, the similarity score is a PMS-LCS pair.

In some embodiments, the non-match probability measure is a false match rate (FMR).

In some embodiments, the method further comprises selecting the at least one parameter from a list of parameters.

In some embodiments, the at least one parameter is at least one of an area A of the region of interest.

In some embodiments, the similarity score is a maximum value of an areal cross-correlation function for a first area X associated with the first ballistic specimen and a second area Y associated with the second ballistic specimen.

In some embodiments, the ballistic specimens are bullets or cartridge cases.

In a second broad aspect, there is provided a system for determining a similarity or distance measure between a first ballistic specimen and a second ballistic specimen. The system comprises at least one processor and a non-transitory computer-readable medium having stored thereon program instructions. The program instructions are executable by the at least one processor for acquiring topographic data from the first ballistic specimen and the second ballistic specimen of at least one region of interest; computing from the topographic data at least one similarity score s for the first ballistic specimen and the second ballistic specimen; determining a non-match probability measure of the similarity score for at least one parameter characterizing a macroscopic and/or microscopic feature of the topographic data, the non-match probability measure associating the first ballistic specimen and the second ballistic specimen to a different source; and correcting the similarity score by determining a corrected similarity score that yields a same value of the non-match probability measure as the similarity score for a reference value of the at least one parameter.

In some embodiments, the reference value is a mean of the at least one parameter for a given type of ballistic specimen.

In some embodiments, the at least one parameter is at least one of a length L of the region of interest and a roughness R of a surface of the region of interest.

In some embodiments, the roughness R is an absolute profile slope between peaks and valleys of the region of interest.

In some embodiments, the similarity score is a maximum value of a cross-correlation function for a first profile X associated with the first ballistic specimen and a second profile Y associated with the second ballistic specimen.

In some embodiments, the similarity score is at least one of a pattern matching score (PMS) and a line counting score (LCS).

In some embodiments, the similarity score is a PMS-LCS pair.

In some embodiments, the non-match probability measure is a false match rate (FMR).

In some embodiments, the program instructions are further executable for selecting the at least one parameter from a list of class C characteristics and roughness parameters R.

In some embodiments, the at least one parameter is at least one of an area A of the region of interest.

In some embodiments, the similarity score is a maximum value of an areal cross-correlation function for a first area X associated with the first ballistic specimen and a second area Y associated with the second ballistic specimen.

In some embodiments, the ballistic specimens are bullets or cartridge cases.

Many further features and combinations thereof concerning embodiments described herein will appear to those skilled in the art following a reading of the instant disclosure.

BRIEF DESCRIPTION OF THE DRAWINGS

Further features and advantages of embodiments described herein may become apparent from the following detailed description, taken in combination with the appended drawings, in which:

FIGS. 13A-13H are graphs of an example statistical distribution of the CCFMax, with and without score correction for non-match copper jacketed bullet profiles of .45 Auto caliber;

DETAILED DESCRIPTION

Figure 1:
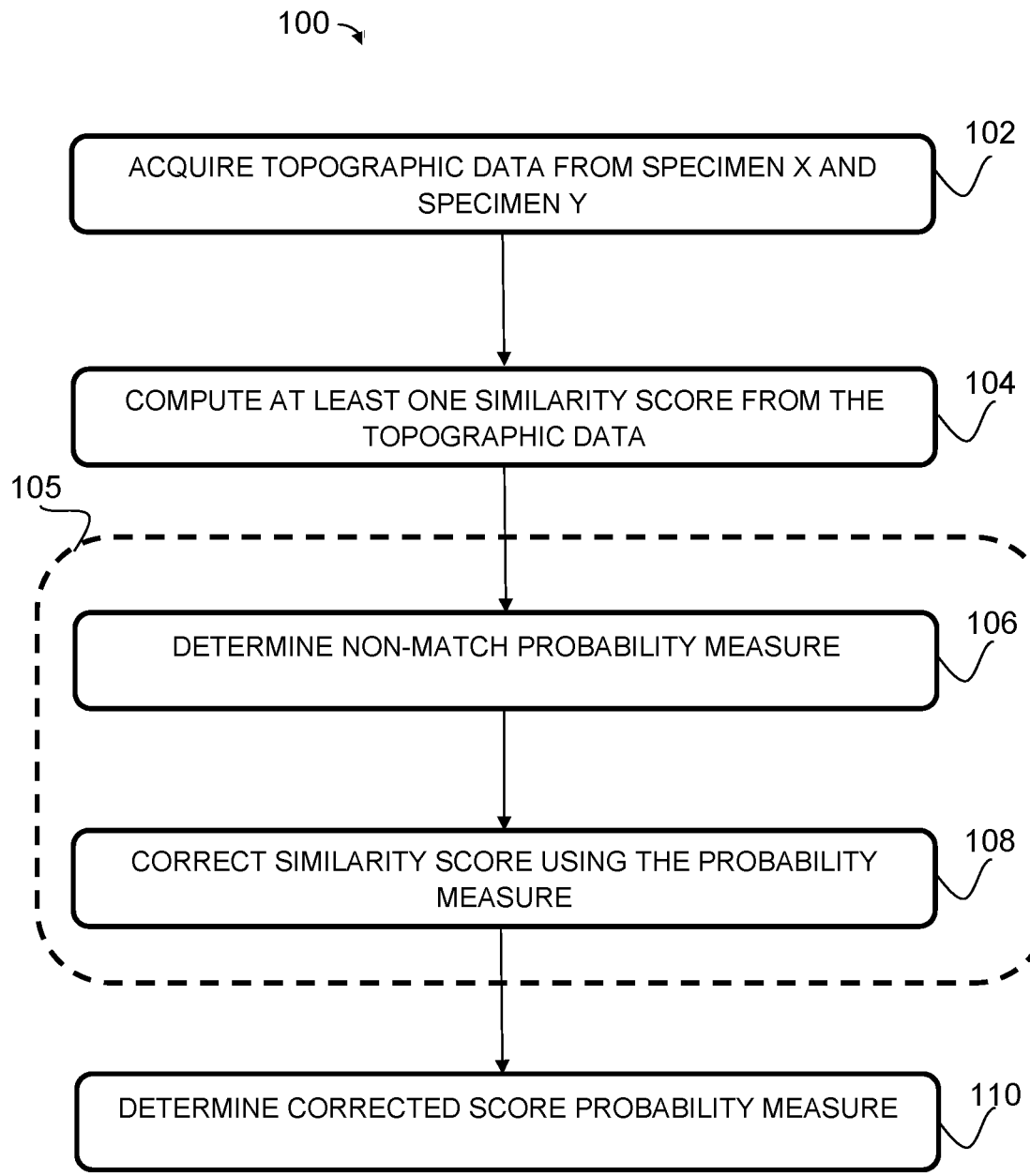
FIG. 1 is a flowchart of an example method for determining a similarity measure between two ballistic specimens.

A ballistic or toolmark identification analysis is generally performed to determine whether markings present on two or more specimens result from an interaction with a same tool. This task is traditionally performed by a trained firearm or toolmark examiner who visually compares pairs of specimens using an optical comparison microscope, or using the more recently developed virtual comparison microscopy which relies on high precision surface topography capture and sophisticated computer image rendering. The training of a firearm or toolmark examiner consists in observing thousands of examples of common source pairs of markings (also called known matches) and different source pairs of markings (called known non-matches) for various type of firearms, tools, materials, etc. Through this training the examiner builds a mental representation of the expected amount of similarities for matches and non-matches under various conditions against which he/she evaluates the current pair of toolmarks under evaluation.

Proficiency tests demonstrate that the error rate of trained examiners is very low, generally less than 1%, whether the compared specimens come from a single source or from distinct sources, but it is almost impossible to infer the probability of making an error for any given comparison.

On the other hand, the computerized comparison of numerical representations of the topography of toolmarks naturally leads to a quantitative analysis. Several methods and software packages provide at least one score S that relates to the similarity observed between two toolmarks.

However, a single similarity score S (or a collection of N scores $S_i$, i=1 to N) calculated for a given pair of specimens is of little use; the typical behavior (or statistical properties) of the score is unknown, for both matches and non-matches. Such behavior is described as the statistical distribution of scores (more specifically the probability density) of the score value S, given that the two compared toolmarks constitute a match or a non-match, respectively: $P_M(S)$ and $P_{NM}(S)$. A straightforward evaluation of the validity of the common source proposition can be derived for any values of S, provided both probability density functions are well known for all possible output scores S. Alternately, the probability that two bullets (or cartridge cases) fired from different firearms will score higher than a given score S can be computed, provided that the non-match probability density is known.

Unfortunately, such probability densities are not usually well known for the whole S domain. Furthermore, they vary significantly with tool parameters, such as the tool manufacturing process, the tool surface material, the intensity of the interaction, etc. For ballistic identification, the probability densities vary with firearm caliber and manufacturer, ammunition type, and surface material, etc.

In practice, this implies that for each ballistic comparison process, the statistical distribution for matches and non-matches must be calculated using a collection of firearms of the same make and model than the suspected one and with the same type of ammunition as found at the crime scene. The statistical distribution of match scores can be approximated by firing several bullets, provided that the expert is in possession of the suspected firearm. In order to obtain the corresponding non-match distribution, the expert must obtain a series of score values from the comparison of the fired specimens with a collection of specimens of the same type (bullets or cartridge cases) fired from firearms of the same make and model and with the same type of ammunition. The behavior of the non-match score distribution is particularly important for the highest scores, similar to that of matches. However, since non-matches rarely generate such high score values, the list of firearms must include hundreds, if not thousands, of items in order to construct the non-match score distribution.

There is described herein a method that transforms the comparison score value S into a new corrected score value in such a way that the statistical distribution of corrected non-match scores is nearly insensitive to the firearm and ammunition make and model and bullet materials. The resulting universal non-match score distribution will necessarily be better documented that any specific distribution, and therefore more robust and precise for large S values that are typical for common source cases. The identification process can then focus on the evaluation of the match score distribution, the non-match score distribution being given by the universal non-match distribution. Also described herein are methods and systems for determining a similarity measure between a first ballistic specimen and a second ballistic specimen. The similarity measure is a corrected similarity score that has low-sensitivity to specimen-specific parameters, such as caliber, firearm brand, ammunition type, and composition of the specimens, such that it may be determined whether toolmarks on specimens are from a different source or a common source.

Figure 2:
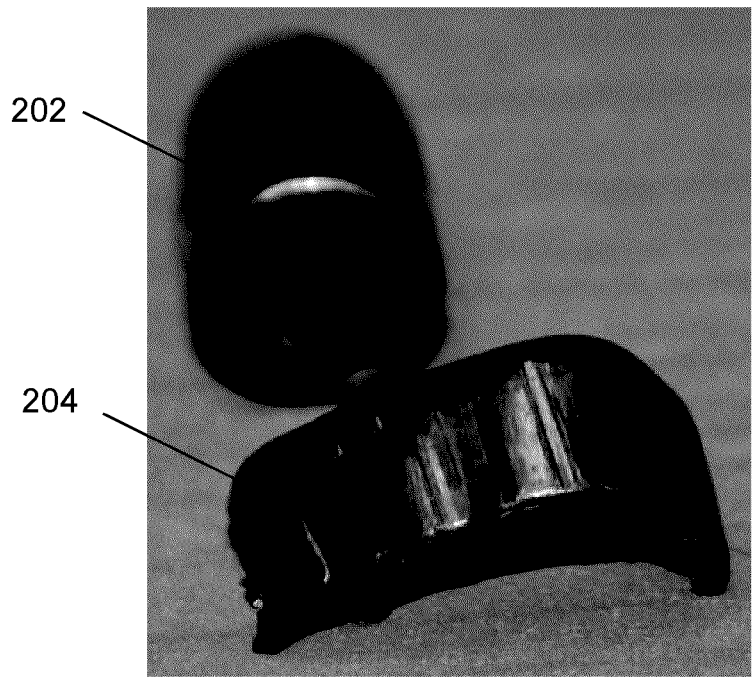
FIG. 2 is a schematic diagram of two example ballistic specimens (projectiles)

With reference to FIG. 1, there is illustrated an example method 100 for determining the similarity measure between two ballistic specimens. At step 102, topographic data is acquired from a first ballistic specimen X and a second ballistic specimen Y. Two example ballistic specimens are illustrated in FIG. 2, namely a non-deformed bullet 202, and a deformed bullet 204. Although the examples illustrated are bullets, the ballistic specimens may also be cartridge cases. No two toolmarks produced by the same tool are identical at the lateral and depth resolutions relevant for firearm identification. However, there are generally sufficient similarities between toolmarks associated with the same tool. Some example toolmarks for ballistic identification of firearms are the breech face mark, firing pin mark, aperture shear marks, ejector mark, extractor mark and chamber mark on cartridge cases, and parallel striations on bullets. Most bullet markings unique to a given firearm are present on a small set of regions of interest (typically between 1 and 24) called land engraved areas (LEAs), which are in contact with the barrel during firing.

Figure 3:
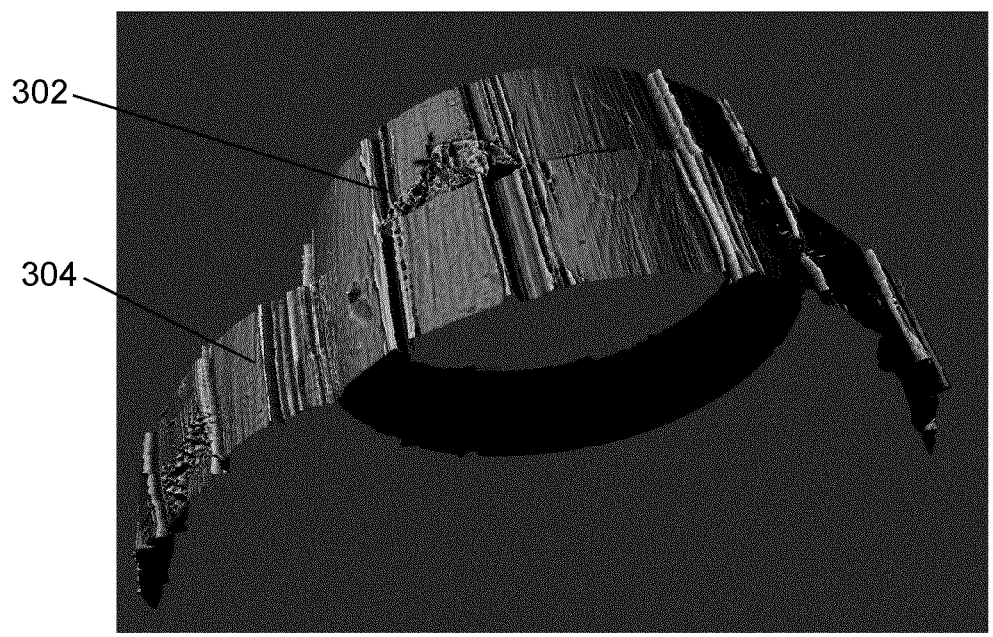
FIG. 3 is an image of example topographic data for the example ballistic specimens of FIG. 2.

FIG. 3 illustrates an example of topographic data 302, 304 for the non-deformed bullet 202 and deformed bullet 204, respectively. The topographic data may take various forms, such as but not limited to a 3D map of the surface of the specimen, a 2D map of the surface of the specimen (i.e. without shape information of the specimen, also called a roughness image), a reflectance image, and the like, and is acquired using an image acquisition tool, such as a high resolution microscope, a high resolution 3D sensor, and the like. In some embodiments, the measured topography is converted into a profile by averaging the areal topographic measurements along the main orientation of the striations, thus reducing the contribution of the instrumental noise and smoothing out the random fluctuations of the bullet topography at very small depth scales which are irrelevant for firearm identification.

Referring back to FIG. 1, at least one similarity score is computed from the topographic data at step 104. In the context of automated ballistic identification systems, similarity scores can be used for three distinct purposes, namely ballistic search, score interpretation, and probability interpretation. For ballistic search, score values are sorted to search for potential candidates matching a given specimen from a large database of candidates. Score interpretation consists in using the score value to quantify absolute similarity, which should carry the same degree of confidence or probability. For probability interpretation, a similarity score between two bullets or cartridge cases can be translated into a probability measure from a statistical distribution of scores.

Figure 4A:
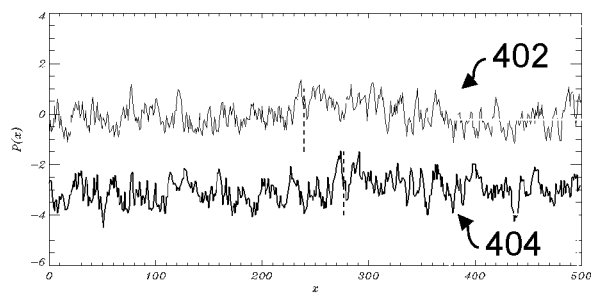
FIGS. 4A-4C are graphs showing an example method for determining a similarity score.

In one embodiment, the similarity score is a maximum value of a cross-correlation function (CCFMax). FIG. 4A illustrates an example of a profile 402 for bullet specimen X and a profile 404 for bullet specimen Y, referred to as profiles X and Y, respectively. These profiles 402, 404 are calculated by subtracting the shape and waviness information from the topographic data, leaving only the roughness at the micron level. The profiles 402, 404 are approximately equal in length, with small expected variations due to the error in setting the limits of each LEA and the small unpredictable stretching of the bullet that may occur during firing.

The CCFMax score of the X and Y profiles may be calculated by translating one profile with respect to the other, while calculating the Pearson correlation coefficient at each relative displacement $\Delta$, and then by selecting the maximum value over the resulting $CCF(\Delta)$ function:

$$CCF\text{Max}(X, Y) = \text{MAX}_\Delta \left( \frac{\sum_i (X_i - X_M)(Y_{i+\Delta} - Y_M)}{\sqrt{\sum_i (X_i - X_M)^2} \sqrt{\sum_i (Y_i - Y_M)^2}} \right), \quad (1)$$

where $X_M$ and $Y_M$ are the mean of the X and Y profiles, respectively. CCFMax is bounded between −1 and +1 and is therefore normalized.

Figure 4B:
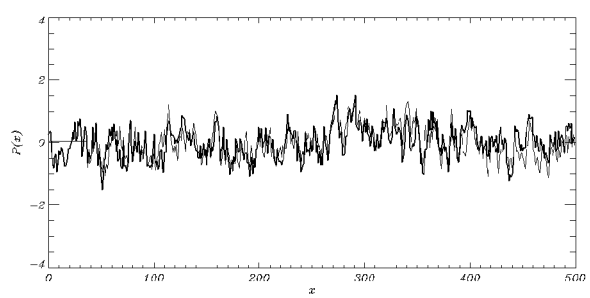
Figure 4C:
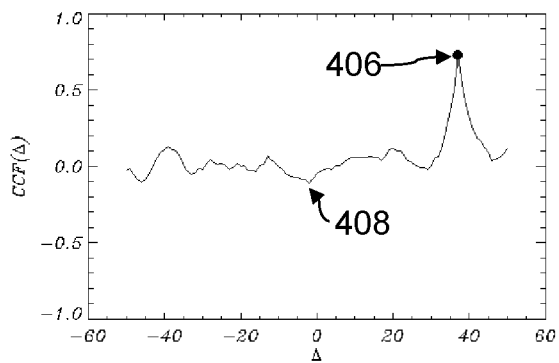

FIG. 4B illustrates the two profiles 402, 404 with the optimal alignment, found at the peak 406 of the curve 408 illustrated in FIG. 4C. It will be understood that other similarity scores may be used, and can be applied to topographic profiles or surfaces. In some embodiments, a distance measure is used, for which a low value implies higher similarity. The method 100 can directly be applied by defining a similarity score equal to the negative of the distance measure or any other decreasing function of the distance measure The process that generates toolmarks on ballistic specimens is a random process. It is observed that the resulting similarity score distribution depends on a small set of fundamental variables that can be directly measured or inferred from the topographic measurements of individual LEA digitized profiles. These fundamental variables fall into two categories: 1) class characteristics, collectively referred to as C, which describe the large-scale or macroscopic properties of the firearm, and 2) roughness variables, collectively referred to as R, which characterize the statistical or microscopic properties of the topographic roughness measurements of each LEA profile. Examples of class characteristics relevant to the analysis of bullets are the length L of the individual LEAs and the number of LEAs present on the surface of the bullets. Examples of roughness variables are the statistical distribution of heights, width or slopes of the peaks and valleys (mean, variance or full histogram of the respective variables); the p parameters of an AR(p) auto-regressive model; any parameters of some more general generative model, including its noise term, and the like. These parameters may also be defined for several lateral resolutions. These fundamental variables can be integers or real numbers. For example, among the class characteristics, the LEA length is a real variable while the number of LEAs is an integer.

Therefore, there is a set of variables C and R for which the conditional distribution of the similarity score S, given C and R, and given the gun and bullet parameters F, A and M, does not depend on the values of F, A and M, where F is the type of firearm that fired the bullet (which includes the caliber and the brand—also described as the firearm manufacturer), A is the ammunition type, and M is the material of the bullet. These variables are referred to herein as parameters that characterize a macroscopic or microscopic feature of the topographic data of the ballistic specimen.

The equivalent mathematical statement is that S is conditionally independent of the set (F, A, M) given C and R:

$$P_{NM}(S|F_1,A_1,A_2,M_1,M_2,C_1,C_2,R_1,R_2)=P_{NM}(S|C_1,C_2,R_1,R_2) \quad (2)$$

where $P_{NM}$ is a non-match probability density and the 1 and 2 indices refer to the two compared specimens, respectively.

Using a set of variables (C, R) that satisfy the above allows the set of (F, M, A) variables to be excluded from the problem. Referring back to FIG. 1, the similarity score obtained at step 104 can be corrected to a similarity score that is independent of these variables at step 105. Comparing two ballistic specimens is greatly simplified because it is no longer necessary to consider the thousands of possible combinations of calibers, brand, ammunition and bullet compositions. Instead, it is sufficient to consider a small number of combinations, provided that they cover the required range of C and R parameters.

A non-match probability measure of the similarity score is determined at 106 and a corrected similarity score is determined at step 108. The non-match probability measure associates the first ballistic specimen and the second ballistic specimen to a different source. In some embodiments, the non-match probability measure is the false match rate (FMR), which is the probability that two bullets fired from different firearms (non-matches) will score higher than a given score s. The non-match probability density $P_{NM}$ is used to calculate the FMR as follows:

$$\mathrm{FMR}(s)=\int_s^\infty P_{NM}(S)dS. \quad (3)$$

The FMR is a decreasing function of the score.

The principles of correcting the similarity score will be described for profiles created by a one-parameter (α) generating process model where the CCFMax score quantifies their relative similarity. The search for the best alignment methodology is parameterized by a maximum allowed offset $\Delta_{MAX}(L_1, L_2)$ which is a function of the length of the two compared profiles. It is understood that the α parameter is used to model the behavior of the roughness of the profile.

It is assumed that i) the presumably distinct $\alpha_{1,2}$ values of the generation model can be measured or deduced from the two profiles being compared, possibly with some uncertainty; ii) the conditional non-match probability density of s given $L_{1,2}$ and $\alpha_{1,2}$:

$$P_{NM}(s|L_1,L_2,\alpha_1,\alpha_2) \quad (4)$$

is known, either analytically, or through numerical simulations, or by any other means, and; iii) the false match rate function, FMR $(s|L_1, L_2, \alpha_1, \alpha_2)$, can be calculated from this non-match score distribution.

Correction of the similarity score, as per step 108, is based on the existence of a function G $(s|L_1, L_2, \alpha_1, \alpha_2)$ whose properties ensure that the statistical distribution of the new score $s_0$:

$$s_0=G(s;L_1,L_2,\alpha_1,\alpha_2) \quad (5)$$

meets an interpretability criterion. The interpretability criterion is satisfied if a threshold value T can be adopted that discriminates between bullet pairs that may or may not require further analysis by an expert, and that has the same meaning for any L and α. This is indeed the case if one chooses a continuous decreasing function Φ of one variable, with a range [0,1], and defines the new score as the solution of the following equation:

$$\Phi(s_0)=\mathrm{FMR}(s|L_1,L_2,\alpha_1,\alpha_2). \quad (6)$$

A score $s_0$ greater than some adopted threshold T implies that the FMR is less than Φ(T), a statement that has the same meaning for any L and α. Equation (6) has a unique solution since the functions Φ and FMR are both continuous, decreasing, and share the same range. Formally:

$$s_0=G(s;L_1,L_2,\alpha_1,\alpha_2)=\Phi^{-1}(\mathrm{FMR}(s|L_1,L_2,\alpha_1,\alpha_2)) \quad (7)$$

since Φ has an inverse.

The new (or corrected) score can be redefined as:

$$s_0=s+\delta(s;L_1L_2\alpha_1\alpha_2) \quad (8)$$

where δ is a function whose absolute value is, on average, as low as possible.

Combining this constraint and the G function defined above, we conclude that a valuable function Φ is the FMR conditional to representative values of L and α:

$$\Phi(s_0)=\mathrm{FMR}(s|L_1L_2\alpha_1\alpha_2)=\mathrm{FMR}_0(s_0). \quad (9)$$

Here $L_0$ and $\alpha_0$ are constant, representative, values based on some prior knowledge of a large set of profiles, and should remain fixed, thus acting as a reference. They should be chosen so as to minimize the correction applied to the score for most bullet pairs. These values may be, for example, the average or median of values for representative profiles of the most common calibers, ammunition or bullet materials, or the average of their minimal and maximal respective values, or alike.

The new (or corrected) score is therefore the solution of the following equation:

$$FMR_0(s_0) = FMR(s|L_1, L_2, \alpha_1, \alpha_2) \quad (10)$$

Thus, $s_0$ yields the same false match rate (with the fixed values $L_0$ and $\alpha_0$) as the original scores with the values $L_1$, $L_2$, $\alpha_1$, and $\alpha_2$ measured or inferred from the compared profiles.

In some embodiments, a corrected score probability measure is determined at step 110. The corrected score probability measure associates the first ballistic specimen and the second ballistic specimen to a common source. Alternately, it evaluates the probability that specimens associated to different sources yields the observed level of similarity. In some embodiments, the corrected score probability measure is the likelihood ratio (LR), which is the ratio of probability density at the score s given that the two bullets were fired from the same firearms (matches) and different firearms (non-matches):

$$LR(s) \equiv \frac{P_M(s)}{P_{NM}(s)} \quad (11)$$

In some other embodiments, the corrected score probability measure is the false match rate (FMR), which is the probability that two bullets fired from different firearms (non-matches) will score higher than a given score s. The non-match probability density $P_{NM}$ is used to calculate the FMR as follows:

$$FMR(s) = \int_s^\infty P_{NM}(S) dS. \quad (12)$$

As hereinabove, the length L and the parameter $\alpha$ are a class characteristics and a roughness parameter respectively. In the general case, the C and R sets of parameters may contain more than one variables.

In some embodiments, the method 100 further comprises determining or selecting the variables C and R that are appropriate for the type of specimens and region of interest in question. Any choice of variables may be validated with numerical experiments by testing the conditional independence (equation (2)) for toolmarks on a small set of representative firearm types F, ammunitions A and bullet materials M. Variables C and R, once defined, can be validated by different approaches, two of which are described herein, each involving four steps.

The first step, common to both approaches, is to create samples of bullet topographic profiles from a series of firearms that cover a wide range of class characteristics, for example .25 Auto, 9 mm, and .45 Auto calibers, and to select bullet materials with very different properties, e.g. copper jacketed and lead. The different calibers and materials should be represented equally to ensure a well-balanced dataset. Comparison of all pairs of non-match bullets associated with the same firearm type F gives a conditional empirical distribution of non-match scores $P_{NM,E}$ given the known F, A and M variables:

$$P_{NM,E}(S|F, A_1, A_2, M_1, M_2) \quad (13)$$

The second step, also common to both approaches, is to define C and R variables and develop a procedure that determines their values for the LEAs present on every bullet.

The third step differs between the two proposed approaches. Its purpose is to demonstrate that the selected C and R variables satisfy the conditional independence criterion.

In the first proposed approach, the third step consists in building the empirical conditional distribution of the score S given the known F, A, and M, and given C and R variables, for non-matches:

$$P_{NM,E}(S|C_1, C_2, R_1, R_2, F, A_1, A_2, M_1, M_2) \quad (14)$$

The conditional independence criterion then becomes:

$$P_{NM}(S|C_1, C_2, R_1, R_2, F, A_1, A_2, M_1, M_2) = P_{NM}(S|C, C_2, R_1, R_2) \quad (15)$$

and may be tested using statistical hypothesis testing techniques.

In the second proposed approach, a generative model of synthetic profiles, based on the variables C and R, may be developed. Non-match bullet profiles are then generated from the empirical distribution of variables C and R (given F, A and M). Each pair of non-match (synthetic) bullets associated with the same type of firearm F is then compared. The conditional distribution of synthetic non-match scores given the known F, A and M, and given C and R variables is constructed, and the conditional independence criterion is tested using hypothesis techniques. Using this method, very large samples of synthetic profiles can be created, much larger than the sample of physical bullets. However, this is done at the cost of an additional intermediate step, which is to validate that the method of generating synthetic profiles does indeed produce a distribution of scores that is identical, within the expected statistical fluctuations, to that of the scores produced by the physical profiles. If the conditional independence hypothesis for toolmarks is not rejected, the probability $$P_{NM}(S|C_1, C_2, R_1, R_2) \quad (16)$$

can then be calculated from the synthetic profiles.

Regardless of the approach considered, the final step is to validate the score correction process, i.e. to confirm that the probability distribution of the new score so, given F, A, and M, is indeed independent of these parameters. This can be achieved by calculating the empirical conditional distribution $P_{NM,E}(s_0|F, A_1, A_2, M_1, M_2)$, or equivalently the corresponding false match rate function, for the different available combinations of F, A, and M, and demonstrating that they are identical, within reasonable fluctuations, by statistical hypothesis tests. Agreement is particularly useful for the highest scores that can be used to extrapolate to the region of missing non-match data.

In some embodiments, the LEA length may be used for score correction for bullets fired by conventional (i.e., non-polygonal or unrifled) barrels. The CCFMax score is used as a similarity measure and the applicability of the method is described for copper jacketed bullets fired from 9 mm and .25 Auto. A sample of hundreds of bullets fired from various 9 mm and .25 Auto firearms are selected and imaged. Since all these bullets have the same number of LEAs (6), the effect of this class characteristic (the number of LEAs) on the score distribution cannot be measured. The set of class characteristics is therefore reduced to the LEA length L. The length is extracted from each LEA profile, and a score is calculated for each pair of non-match bullets of the same caliber. Here, the LEA-to-LEA score is given by the CCF- Max, and the score s of the pair of bullets is defined as the highest LEA-to-LEA scores at the best phase. The statistical distribution of L is also determined for each caliber.

Figure 5A:
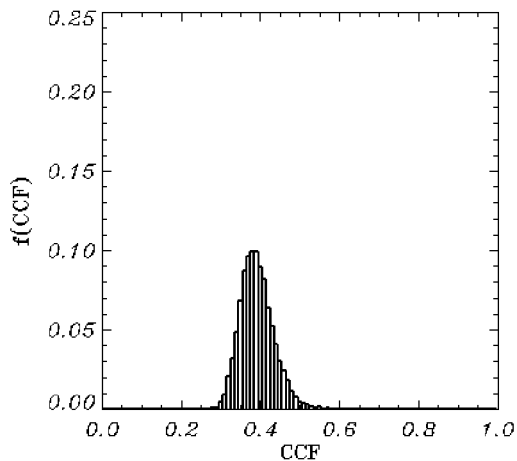
FIGS. 5A-5D are graphs showing an example probability density distribution for CCFMax for non-match copper jacketed bullet profiles of two calibers (9 mm and .25 Auto), and corresponding false match rate ($\log_{10}$ FMR) functions.
Figure 5B:
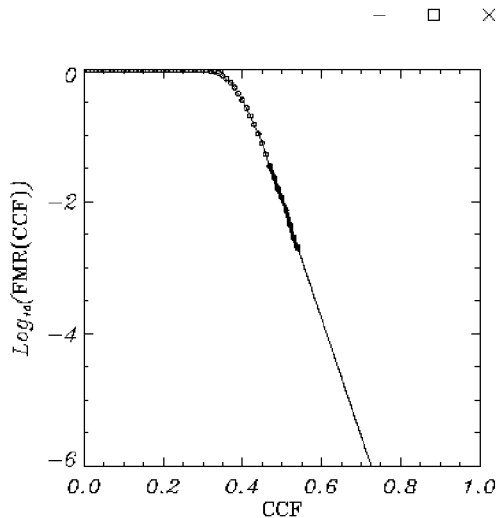
Figure 5C:
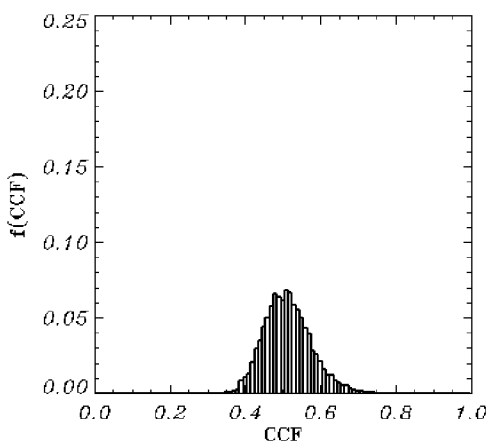
Figure 5D:
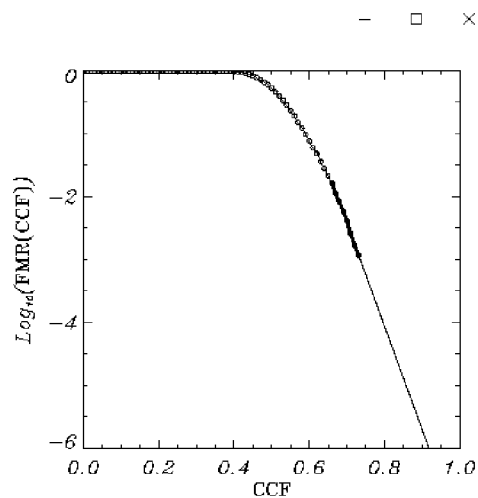
Figure 6A:
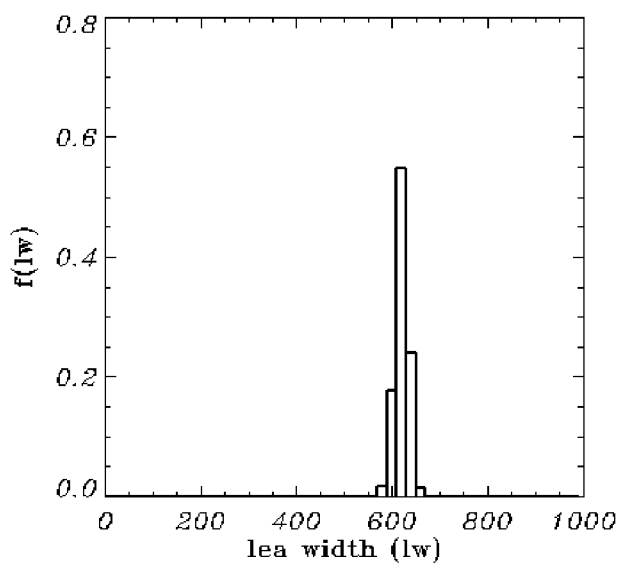
FIGS. 6A-6B are graphs of an example statistical distributions of the LEA length (in pixels) for two calibers (9 mm and .25 Auto)
Figure 6B:
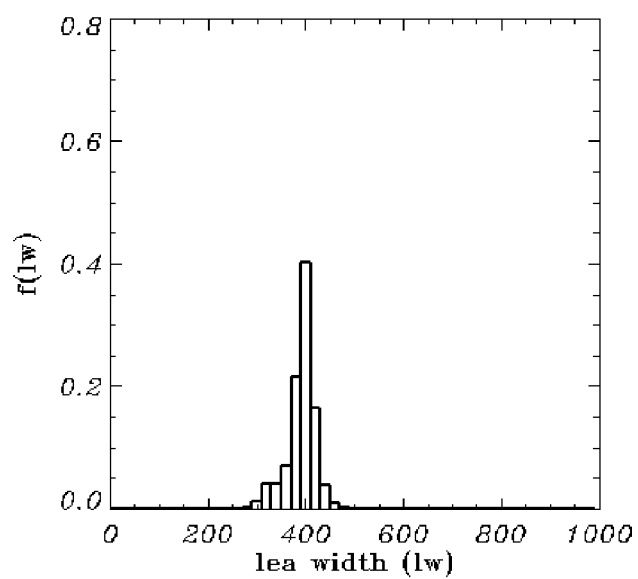

FIGS. 5A and 5C show the probability density of CCF-Max for non-match copper jacketed bullet profiles of 9 mm (FIG. 5A) and .25 Auto (FIG. 5C) calibers. The corresponding false match rate ($\log_{10}$ FMR) functions are also shown in FIGS. 5B and 5D, respectively, including the exponential extrapolation in the high score region. The non-match score distributions are significantly different for the two calibers, which demonstrates that the score value (based on the CCFMax in this example) cannot be used as an absolute measure of similarity. FIGS. 6A-6B show that the histogram of the LEA length L differs significantly between both datasets, making L a potential candidate for the score correction process.

Figure 7A:
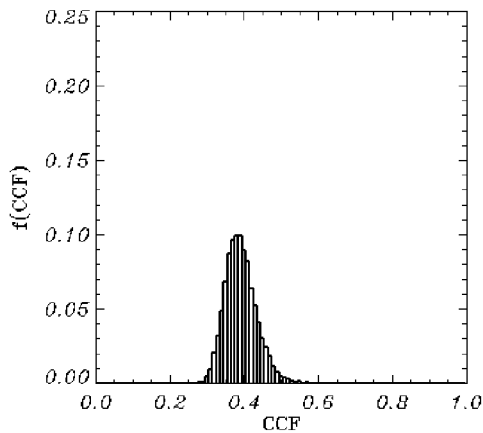
FIGS. 7A-7D are graphs showing an example of a probability density distribution for CCFMax for non-match copper jacketed bullet profiles of 9 mm caliber without a correction and with a correction to the similarity score for LEA length, and corresponding false match rate ($\log_{10}$ FMR) functions.
Figure 7B:
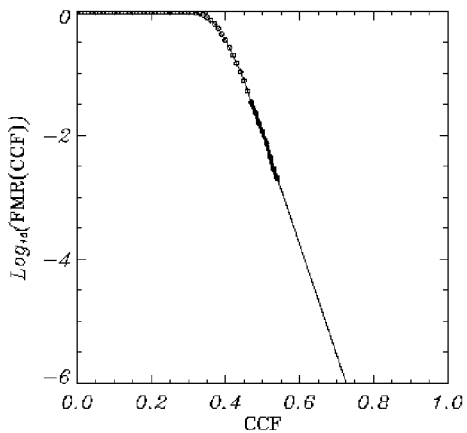
Figure 7C:
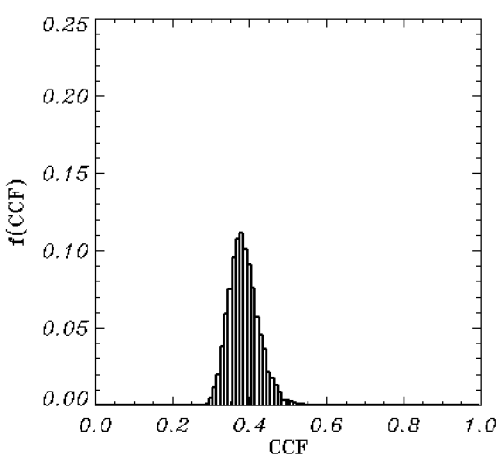
Figure 7D:
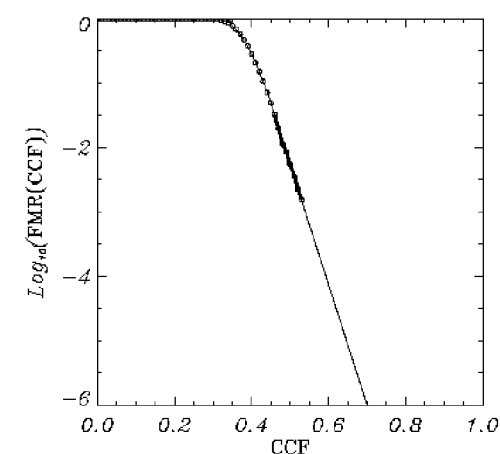
Figure 8A:
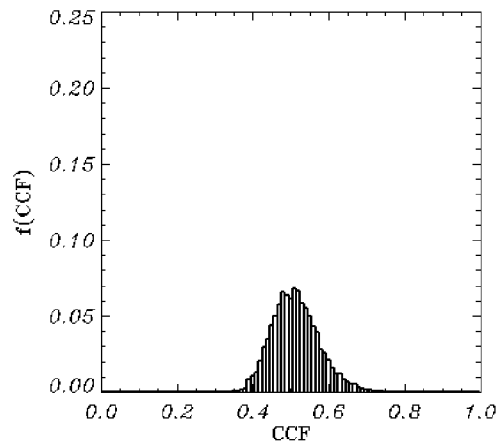
FIGS. 8A-8D are graphs showing an example of a probability density distribution for CCFMax for non-match copper jacketed bullet profiles of .25 Auto caliber without a correction and with a correction to the similarity score for LEA length, and corresponding false match rate ($\log_{10}$ FMR) functions.
Figure 8B:
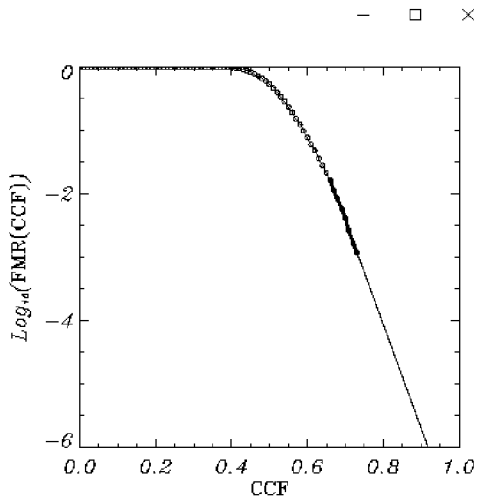
Figure 8C:
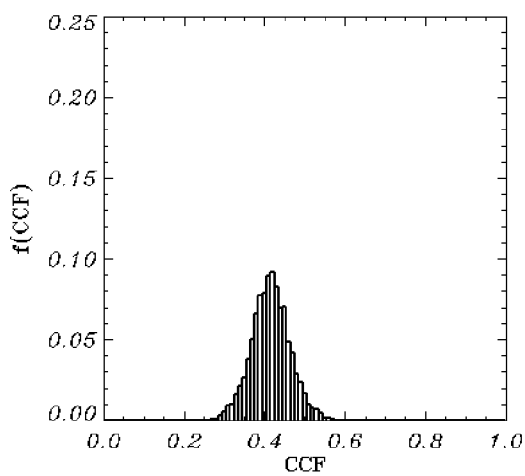
Figure 8D:
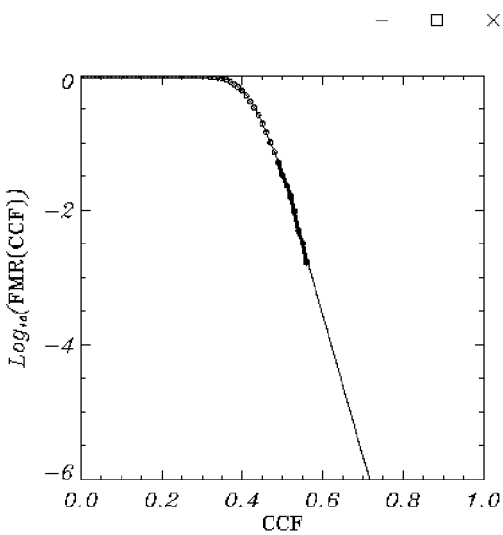

The score correction methodology discussed above can then be applied. The reference LEA length ($L_0$) is defined as the mean LEA length of the widely used 9 mm bullets. FIGS. 7A-7D and 8A-8D illustrate the changes in the non-match score distribution induced by the score correction process. FIGS. 7A-7D show the probability density of the CCFMax for non-match copper jacketed bullet profiles for 9 mm caliber. FIGS. 8A-8D show the probability density of the CCFMax for non-match copper jacketed bullet profiles for .25 Auto caliber. The original scores are shown in FIGS. 7A, 8A, the corrected scores are shown in FIG. 7C, 8C. The corresponding false match rate functions are shown in FIGS. 7B, 8B, 7D, 8D, including the exponential extrapolation in the high score region. The score distribution for 9 mm bullets does not change significantly due to the choice of reference LEA length $L_0$. However, the score distribution of the .25 Auto bullets becomes essentially identical to that of the 9 mm thanks to the score correction process. The extrapolation in the high score region of the FMR function (by an exponential function) is also in agreement for both calibers.

In some embodiments, the LEA length and a roughness variable R are used for score correction. A dataset consisting of copper jacketed bullets fired from 9 mm and .45 Auto calibers is used to demonstrate this. All bullets have the same number of LEAs (6). A sample of hundreds of bullets fired from different firearms of the 9 mm and .45 Auto calibers is selected and imaged. The length L is extracted from each LEA profile. Similarly, a new variable, the mean absolute slope between successive peaks and valleys in the profiles, is defined for each LEA profile. This variable will be denoted R, as it characterizes the behavior of the roughness. A score (the highest CCFMax score from all LEA-to-LEA comparisons) is then computed for every pair of non-match bullets of the same caliber. The statistical distribution of the L and R is also drawn for each caliber.

Figure 9A:
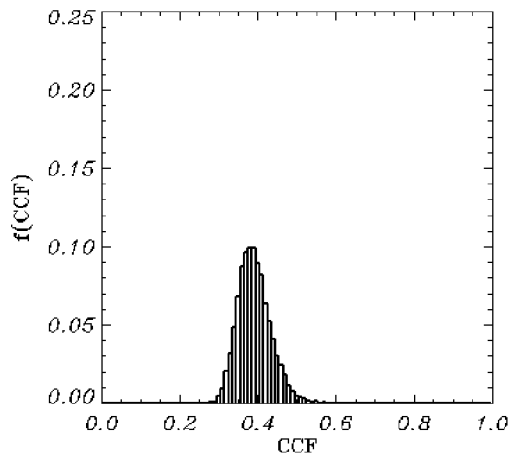
FIGS. 9A-9D are graphs showing an example probability density distribution for CCFMax for non-match copper jacketed bullet profiles of two calibers (9 mm and .45 Auto), and corresponding false match rate ($\log_{10}$ FMR) functions.
Figure 9B:
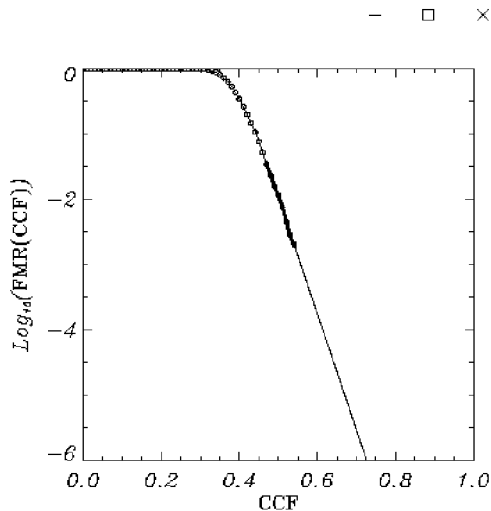
Figure 9C:
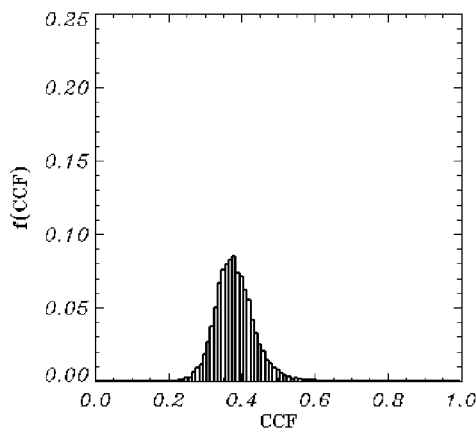
Figure 9D:
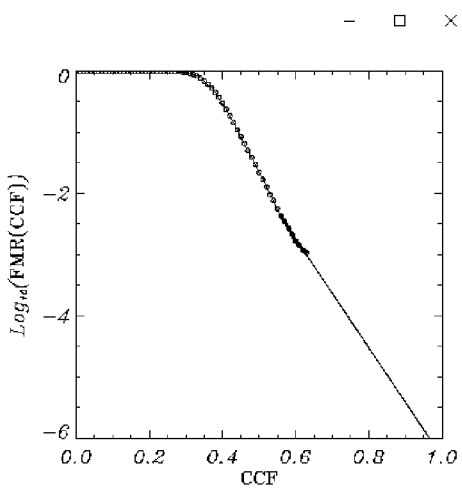
Figures 10A, 10B:
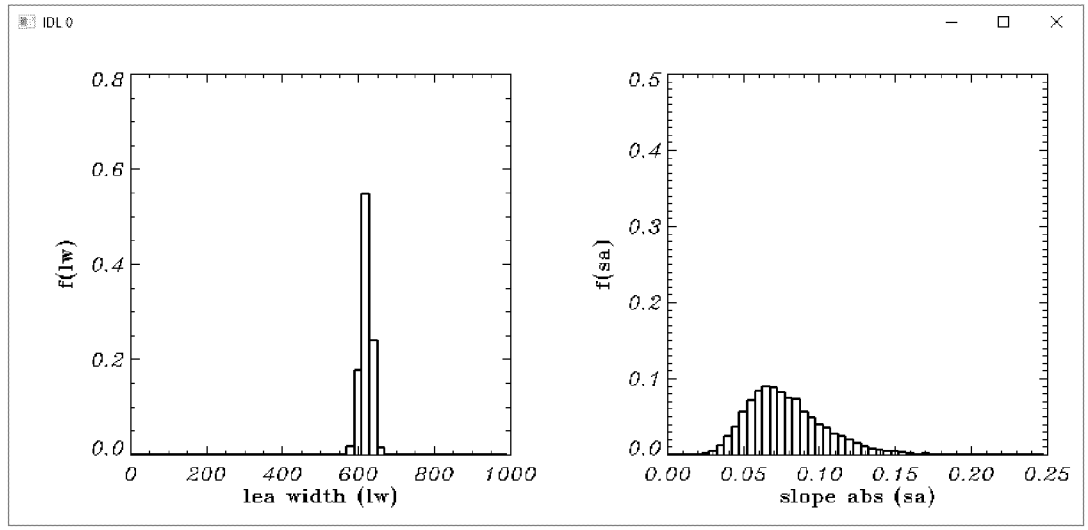
FIGS. 10A-10D are graphs of an example statistical distributions of the LEA length (in pixels) and the mean absolute slope for two calibers (9 mm and .45 Auto)
Figures 10C, 10D:
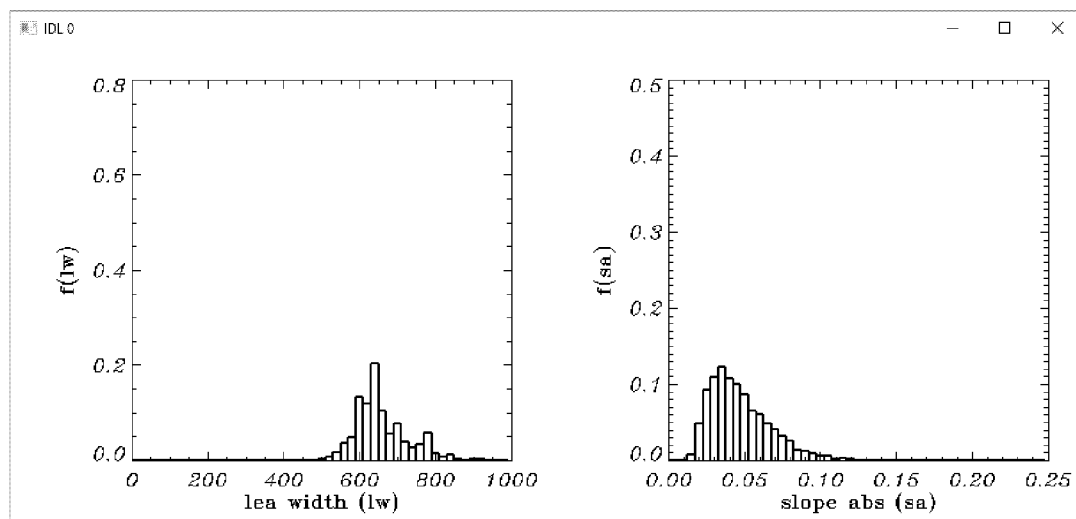

An example of the statistical distribution of the score, and the resulting False Match Rate function FMR(s), for 9 mm caliber (FIGS. 9A-9B) and for .45 Auto caliber (FIGS. 9C-9D) are shown. Extrapolation of the FMR(s) in the high score region, with an exponential distribution, is also shown. The non-match score distributions are significantly different for the two calibers. An example of the statistical distribution of the LEA length (in pixel) and mean absolute slope is illustrated for two calibers fired by conventional barrels: 9 mm (FIGS. 10A-10B) and .45 Auto (FIGS. 10C-10D). The histograms of the LEA length L and the roughness variable are shown to differ significantly between both datasets.

Figure 11A:
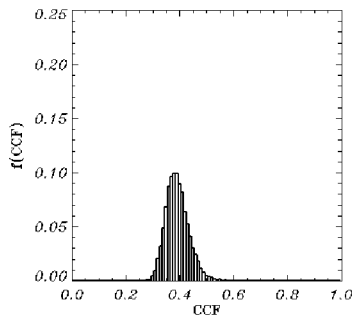
FIGS. 11A-11H are graphs of an example statistical distribution of the CCFMax, with and without score correction for non-match copper jacketed bullet profiles of 9 mm caliber, and corresponding false match rate ($\log_{10}$ FMR) functions.
Figure 11B:
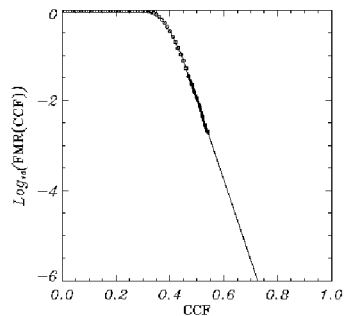
Figure 11C:
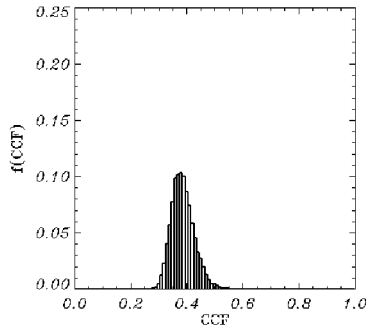
Figure 11D:
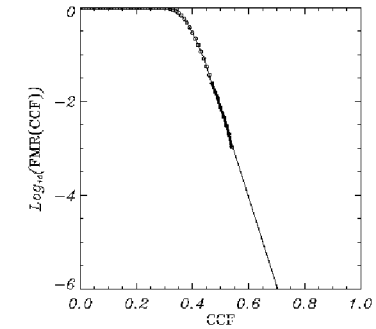
Figure 11E:
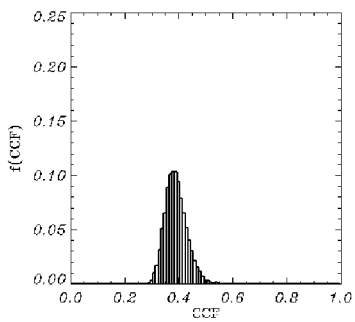
Figure 11F:
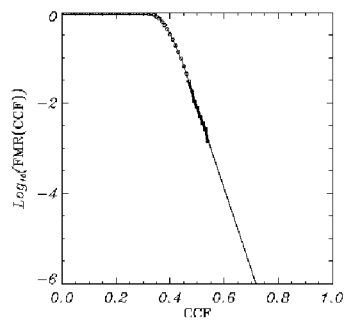
Figure 11G:
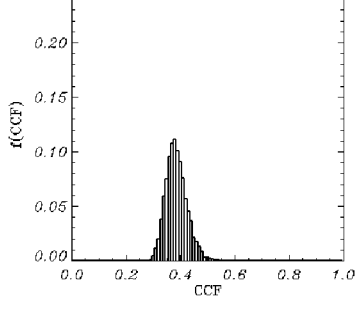
Figure 11H:
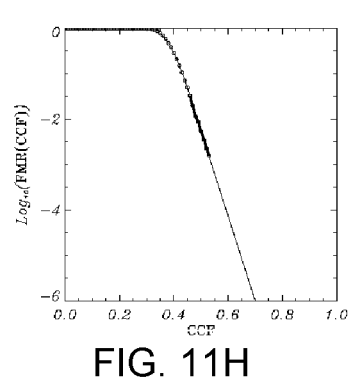
Figure 12A:
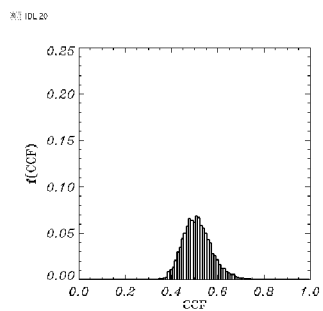
FIGS. 12A-12H are graphs of an example statistical distribution of the CCFMax, with and without score correction for non-match copper jacketed bullet profiles of .25 Auto caliber.
Figure 12B:
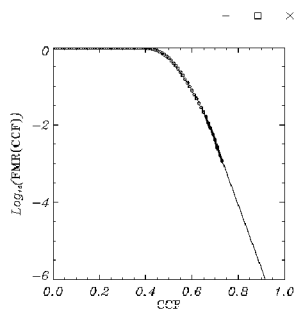
Figure 12C:
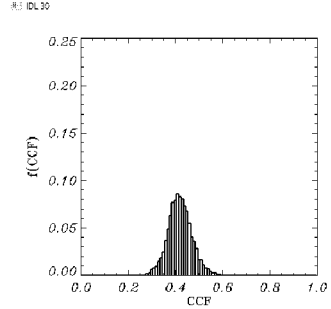
Figure 12D:
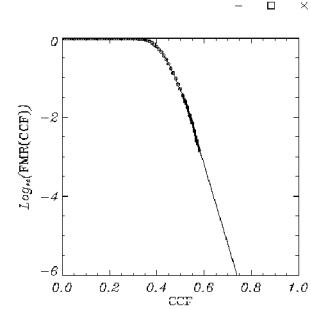
Figure 12E:
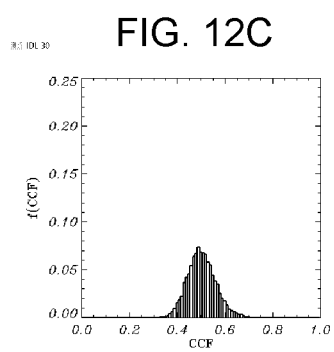
Figure 12F:
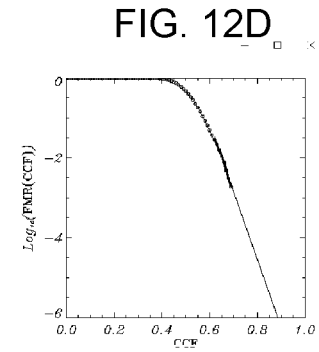
Figure 12G:
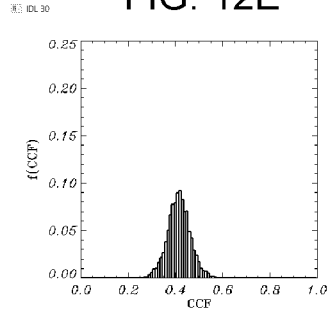
Figure 12H:
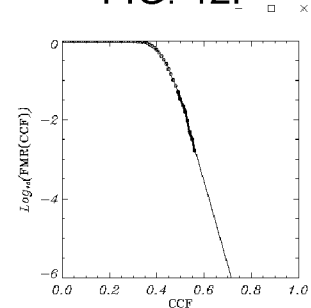

The score correction methodology is applied, this time using the two variables. The reference LEA length ($L_0$) is defined as the mean LEA length of the 9 mm bullets, and similarly for the reference roughness variable ($R_0$). FIGS. 11A-11H show the changes in the non-match score distribution induced by the score correction process for 9 mm, FIGS. 12A-12H show the changes in the non-match score distribution induced by the score correction process for .25 Auto, and FIGS. 13A-13H show the changes in the non-match score distribution induced by the score correction process for .45 Auto. All four cases are considered for each caliber: no correction (FIGS. 11A-B; 12A-B; 13A-B), a correction based on the LEA length alone (FIGS. 11C-D; 12C-D; 13C-D), on the roughness alone (FIGS. 11E-F 12E-F; 13E-F), and on both variables (FIGS. 11G-H; 12G-H; 13G-H). The score distribution of the .45 Auto caliber bullets becomes essentially identical to that of the 9 mm only if the 2-variable score conversion is applied. It turns out that for this example, correction from the LEA length alone is not sufficient. Furthermore, as shown previously, the correction based on the LEA length was sufficient for the .25 Auto caliber, and adding here the correction for the roughness variable does not bring significant change.

The examples above have been presented using CCFMax as the similarity score. In some embodiments, the similarity score is a pattern matching score (PMS), as described in D. Roberge et al., "Objective Identification of Bullets Based on 3D Pattern Matching and Line Counting Scores", International Journal of Pattern Recognition and Artificial Intelligence, Vol. 33, No. 11, (2019), pp. 1-34. The PMS is defined as a weighted sum of the CCFMax and absolute normalized difference AND:

$$PMS = w_{CCF} \times CCF_{MAX} + w_{AND} \times AND; \qquad (17)$$

$$\text{where } AND = 1 - \frac{\Sigma_i |(X_i - X_M) - (Y_{i+\Delta Best} - Y_M)|}{\Sigma_i |(X_i - X_M) + (Y_{i+\Delta Best} - Y_M)|}. \qquad (18)$$

Equation (16) is calculated at the optimal displacement $\Delta$Best determined from the CCFMax.

In some embodiments, the similarity score is a line counting score (LCS), as described in D. Roberge et al. The LCS may be defined as the arithmetic average of contributions from peaks and valleys of the topographic surface:

$$LCS = \frac{1}{2} LCS_{PEAK} + \frac{1}{2} LCS_{VALLEY}. \qquad (19)$$

In some embodiments, more than one similarity score is used, for example PMS and LCS may be used together and represented on a two-dimensional graph, using one or more LEAs. A value of the $CCF_{Max}$ is computed for every LEA-to-LEA comparison. The best LEA pair is defined as the one with the highest $CCF_{Max}$. The PMS and LCS representative of the pair of compared bullets is defined as their respective value for the best LEA pair.

The FMR associated with a PMS-LCS pair is computed in two steps: first, by converting the score pair into a single score D and then by calculating its FMR value from the function FMR(D). The score D is computed by performing an orthogonal projection of the two-dimensional score on a specified line which crosses the origin of the graph and then by computing the distance between the projected point and the origin.

Figures 14A, 14B:
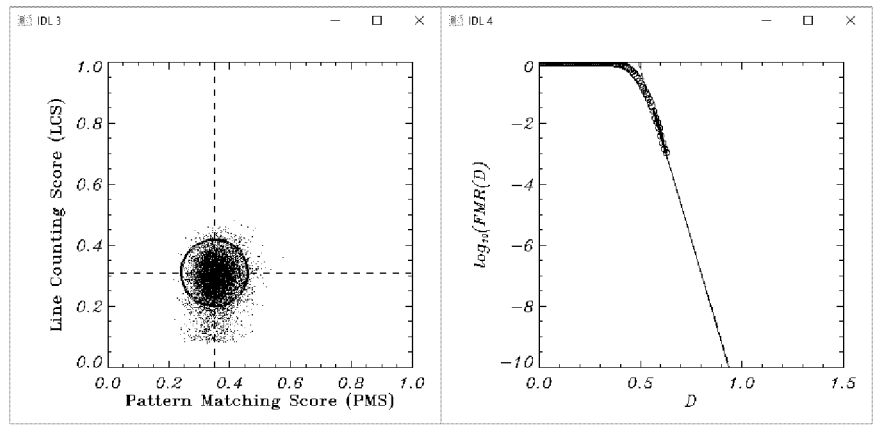
FIGS. 14A-14H are graphs of an example statistical distribution of a PMS-LCS pair in a two-dimensional graph for bullets of four different calibers fired by conventional barrels.
Figures 14C, 14D:
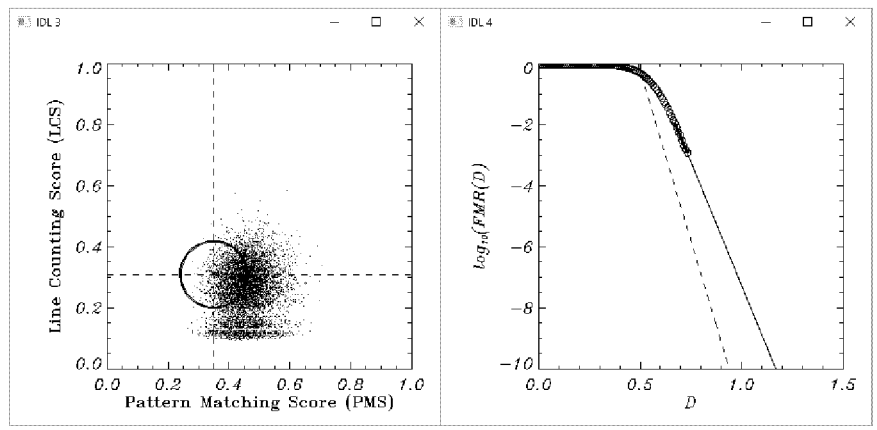
Figures 14E, 14F:
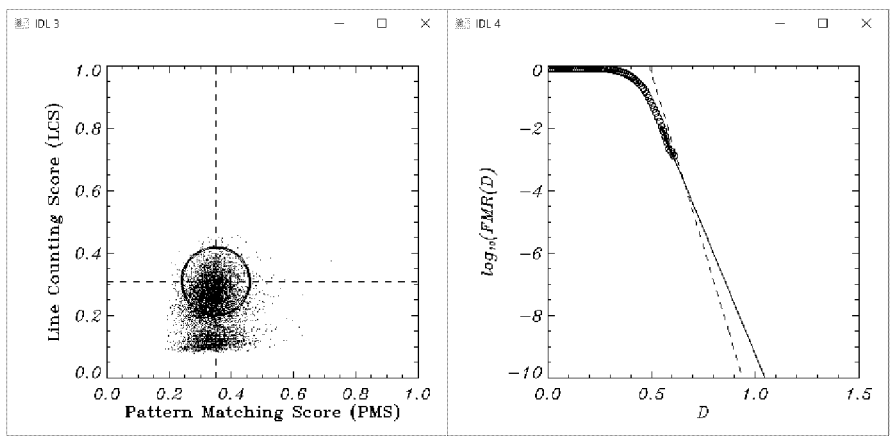
Figures 14G, 14H:
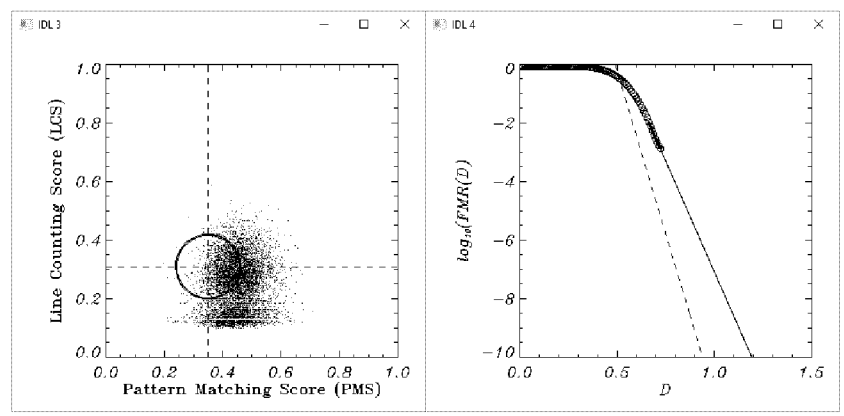

The statistical distribution of the PMS-LCS pair in a two-dimensional graph is compared for bullets fired from a conventional barrel for calibers of 9 mm (FIG. 14A), .25 Auto (FIG. 14C), 45 Auto (FIG. 14E) and .22 (FIG. 14G).

The latter set of bullets are made of lead while the others are copper jacketed. All bullets have 6 LEAs in this example. The resulting false match rate function of the score D—more specifically $\log_{10}(FMR(D))$—is also shown (FIGS. 14B, 14D, 14F, 14H). The score distributions are significantly different for the four calibers, along with the FMR functions. For the score correction process, the reference LEA length ($L_0$) is defined as the mean LEA length of the widely used 9 mm bullets. Similarly, the reference mean absolute slope ($R_0$) is defined as the average of the mean absolute slope of the copper-jacketed 9 mm bullets. These values are fixed as the reference values.

Figures 15A, 15B:
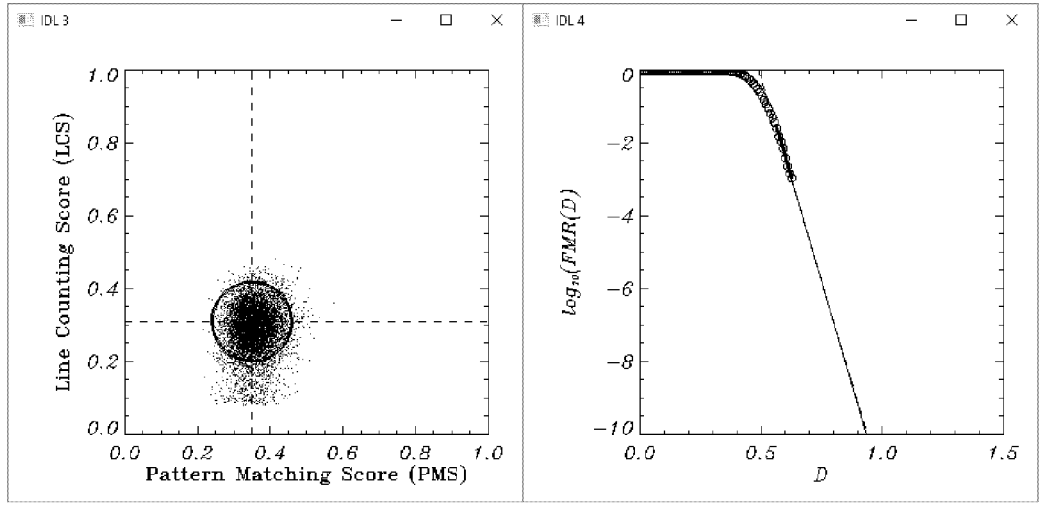
FIGS. 15A-15D are graphs of an example empirical statistical distribution of the PMS-LCS in a two-dimensional graph for physical bullets and synthetic profiles.
Figures 15C, 15D:
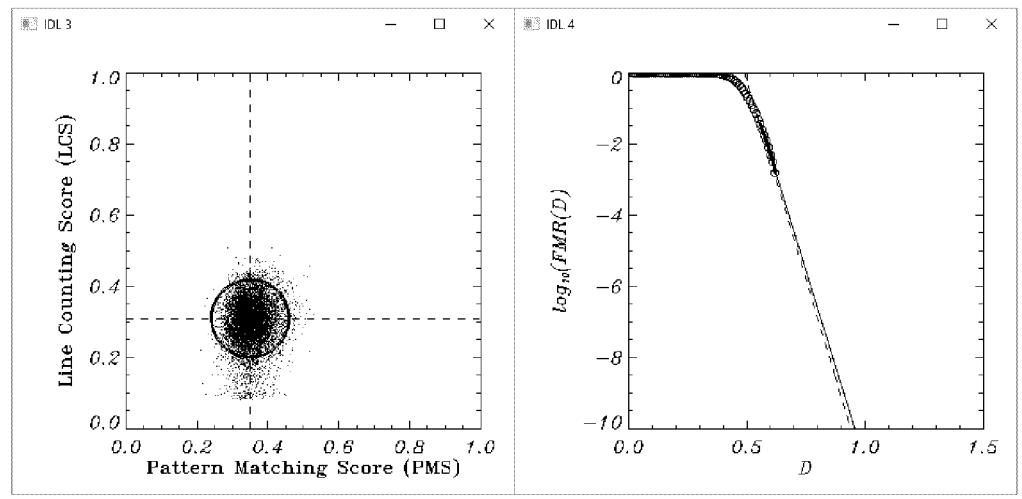
Figures 16A, 16B:
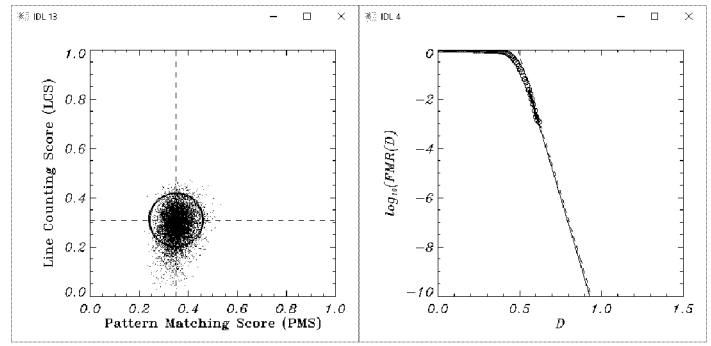
FIG. 16A-16H are graphs of an example statistical distribution of a PMS-LCS pair in a two-dimensional graph for bullets of four different calibers fired by conventional barrels, with a corrected similarity score.
Figures 16C, 16D:
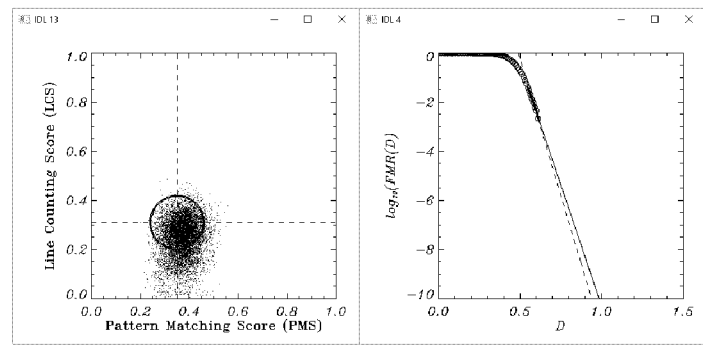
Figures 16E, 16F:
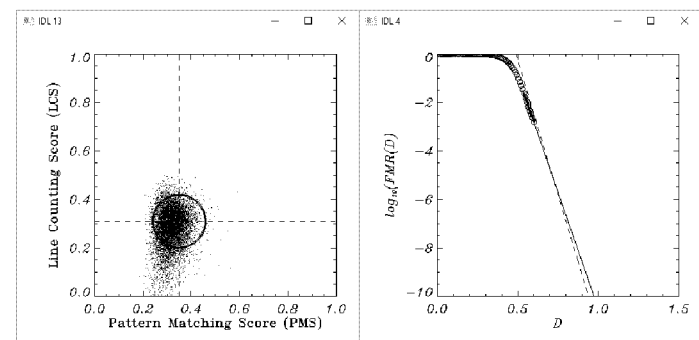
Figures 16G, 16H:
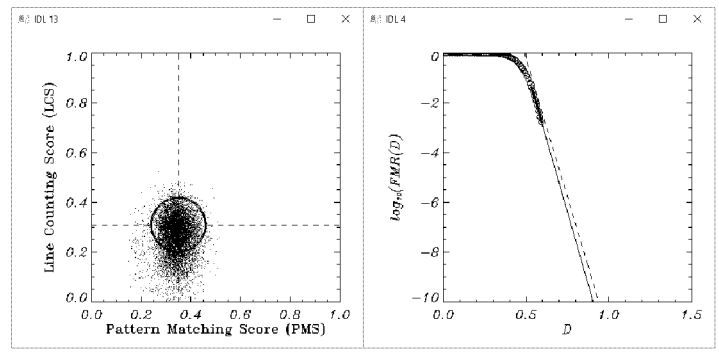

In some embodiments, the C and R variables are determined using synthetic profiles. In this case, profiles may be generated having characteristics that are not available in a given database of physical profiles. A synthetic PMS-LCS distribution in a two-dimensional graph is shown in FIG. 15A, and its corresponding score distribution in FIG. 15B. In this particular case, the PMS and LCS score distribution is created by correlating pairs of synthetic profiles generated with the same statistical distribution of L and R values as the set of physical copper-jacketed 9 mm bullets, shown in FIGS. 15C-15D. The synthetic score distribution is nearly identical to the experimental distribution computed by correlating all non-match pairs of physical 9 mm bullets, which validates the synthetic profile generation method; similarly for the FMR of the score D.

A grid of L and R values may be defined. This grid covers the range actually observed for physical bullets over different calibers and bullet materials. A large set of synthetic bullets, all with 6 "LEA-profiles" is generated for each L-R pair of the grid, using a random number generator and the proper generating process. A large set of synthetic non-match PMS and LCS distributions, each parameterized by four variables: the lengths $L_1$ and $L_2$, and roughness parameter $R_1$ and $R_2$ of a LEA pair, is then generated by correlating pairs of synthetic bullets as if they were physical bullets. A value of the $CCF_{Max}$ is computed for every LEA-to-LEA comparison; the best LEA pair is defined as the one with the highest $CCF_{Max}$. The PMS and LCS representative of the pair of compared bullets is defined as their respective value for the best LEA. The set of non-match synthetic distributions of D score is also computed.

FIGS. 16A-16H compare the statistical distribution of the PMS-LCS pair in a two-dimensional graph, following the score correction process, for 9 mm (FIGS. 16A-16B), .25 Auto (FIGS. 16C-16D), 45 Auto (FIGS. 16E-16F) and .22 (FIGS. 16-G-16H) caliber bullets fired by conventional barrels. The resulting false match rate function is also shown for the score D. The two-dimensional score distribution for 9 mm bullets (FIG. 16A) does not change significantly due to our choice of reference LEA length $L_0$ and roughness $R_0$. However, the score distribution of the .25 Auto (FIG. 16C), 45 Auto (FIG. 16E) and .22 (FIG. 16G) caliber bullets becomes essentially identical to that of the 9 mm (FIG. 16A) thanks to the score correction process. The extrapolation in the high score region of the FMR(D) function (by an exponential function), shown in FIGS. 16B, 16D, 16F, 16H is also nearly in agreement for all calibers.

Figure 17A:
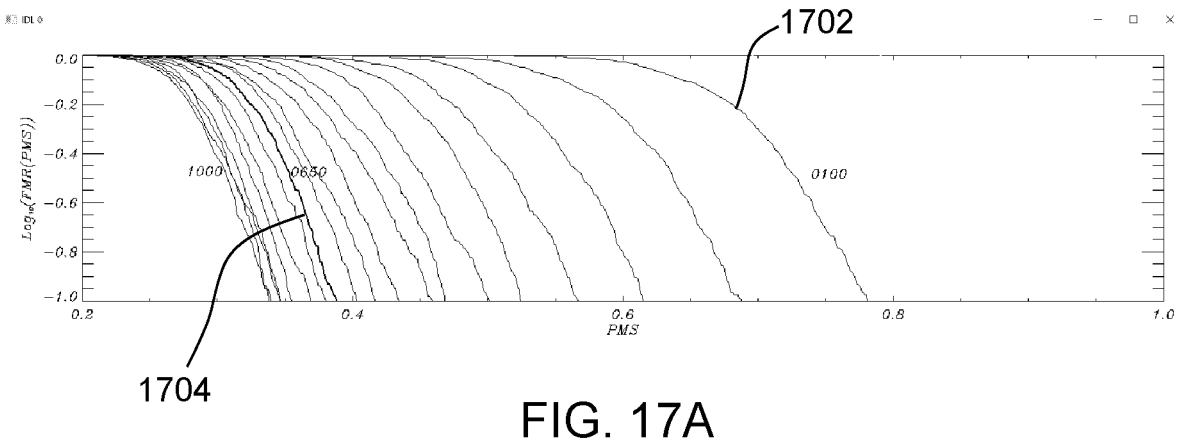
FIGS. 17A-17B graphically illustrate the score correction method.
Figure 17B:
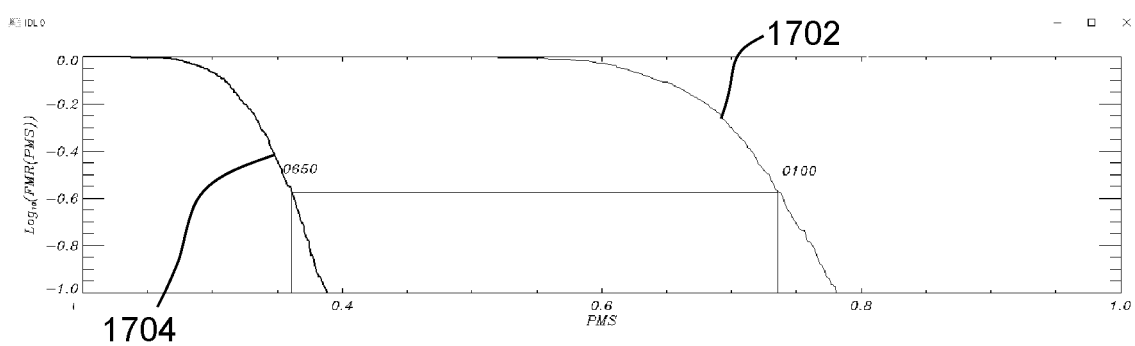

FIGS. 17A-17B graphically illustrate the process of correcting the similarity score. FIG. 17A shows a series of non-match probability measure functions for different values of L, for the specific case of $L_1=L_2=L$. These functions only represent a subset of all the possible functions and additional curves that may be obtained by interpolation. Curve 1702 is for L=100. Curve 1704 is for $L_0$=650, which is the reference that will be used to correct the similarity score at the length of L=100. The similarity score for L=100 is mapped to the reference curve 1704 as shown in FIG. 17B, and the similarity score (s) for L=100 becomes the corrected similarity score ($s_0$) from the curve for $L_0$=650. Stated differently, the non-match probability measure for L=100, s=0.73 is equal to the non-match probability measure for $L_0$=650, $s_0$=0.33.

The score correction methodology can be generalized in several ways. For example, the methodology can be generalized to include uncertainty on the measurements or determined value of the fundamental variables that are real numbers. Considering only the measured LEA lengths $L_1$ and $L_2$ of two one-LEA bullets as an example, their corresponding true LEA length is unknown. One can however treat each true length $L_{1T}$ or $L_{2T}$ as a random variable whose respective statistical distribution given the two measurements, $P(L_T|L_1, L_2)$, is reasonably known from prior knowledge. This distribution can be modelled as a sharply peaked Gaussian with a mean equal to the average of $L_1$ and $L_2$, and a standard deviation equal to the typical error on the LEA length due to the known variability on the placement of its boundary. The variance could also be the difference between the two measurements $L_1$ and $L_2$. Following a Bayesian approach, the non-match score distribution given the measured values can then be computed as a sum (or integral) of contributions from the true lengths $L_{1T}$ or $L_{2T}$, $P_{NM}(S|L_{1T}, L_{2T}, R_1R_2)$, weighted by their statistical distribution given the measurements:

$$P_{NM}(S|L_1,L_2,R_1,R_2)=\int P_{NM}(S|L_{1T},L_{2T},R_1,R_2)P(L_{1T}|L_1,L_2)P(L_{2T}|L_1,L_2)dL_{1T}dL_{2T} \quad (20)$$

which can be solved numerically. This process can be extended to other variables, class characteristics or roughness variables, which are real numbers. Discrete variables, such as the number of LEAs, may have no uncertainty.

The main examples used herein are special cases in which the sets C and R contain only one variable each. The method can be generalized for multi-dimensional sets. The method can also be generalized for several types of scores, with the score correction being applied on each score independently, or on a function of these scores. The method may be applied with more than one similarity score per region of interest. The method may be applied to several regions of interest of a same type per specimen. The method may be applied to several regions of interest of different types of specimens. The non-match probability measure may be computed based on similarity scores obtained from synthetic topographies or profiles, or from measured topographies or profiles.

Figure 18:
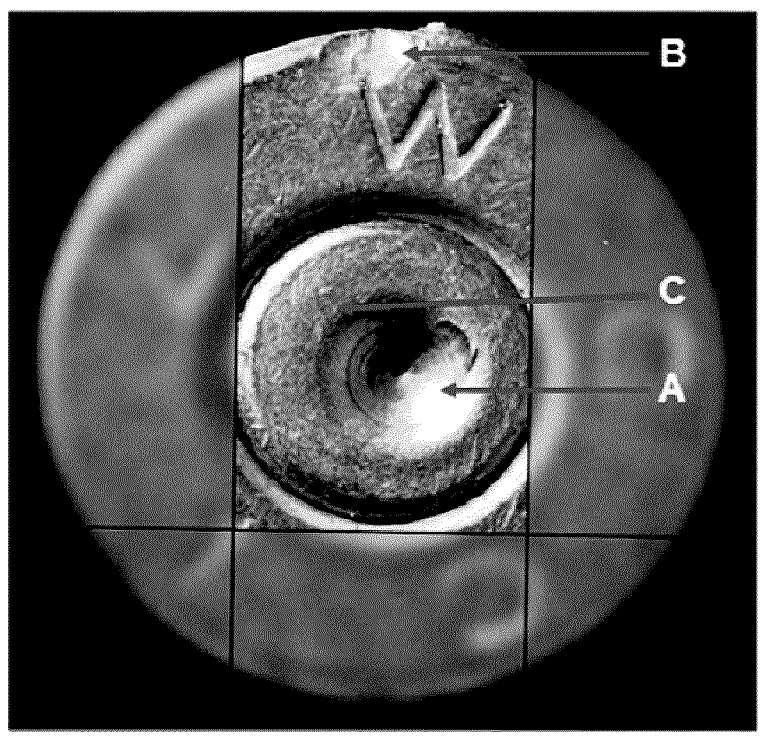
FIG. 18 is a schematic diagram of an example ballistic specimen, showing the breech face and the firing pin of a cartridge case.

The method can be further applied for scoring functions relevant to areal topographic measurements, for example to the breech face or firing pin marks on cartridge cases. An example ballistic specimen is illustrated in FIG. 18, namely a cartridge case 1801 with a firing pin A, ejector mark B and breech face mark C.

In some embodiments, the similarity score is a maximum value of a cross-correlation function (CCFMax) that is generalized for areal topographic measurements. In this case, the systematic search of optimal translation is done along the x and y directions, which generates a 2D map of CCF values. The final CCFMax score is defined as the maximal value over the CCF map.

In some embodiments, the area of the breech face (BF) region of interest of cartridge cases may be used for score correction. This area is defined as the area within the circular boundary of the breech face mark, minus the area of the firing pin (FP) mark. The CCFMax score is used as a similarity measure and the applicability of the method is described for cartridge cases fired from 9 mm firearms with a circular firing pin. A sample of hundreds of 9 mm cartridge cases with a circular firing pin are selected and imaged. The set of class characteristics considered in this example only consists of the area of the BF (as defined above). The circular contours that define the inner and outer boundaries of the BF are extracted for each cartridge case, the corresponding BF area A is computed, and a score is calculated for each pair of non-match cartridge case. The statistical distribution of area A over the set of cartridge cases is also determined.

Figure 19:
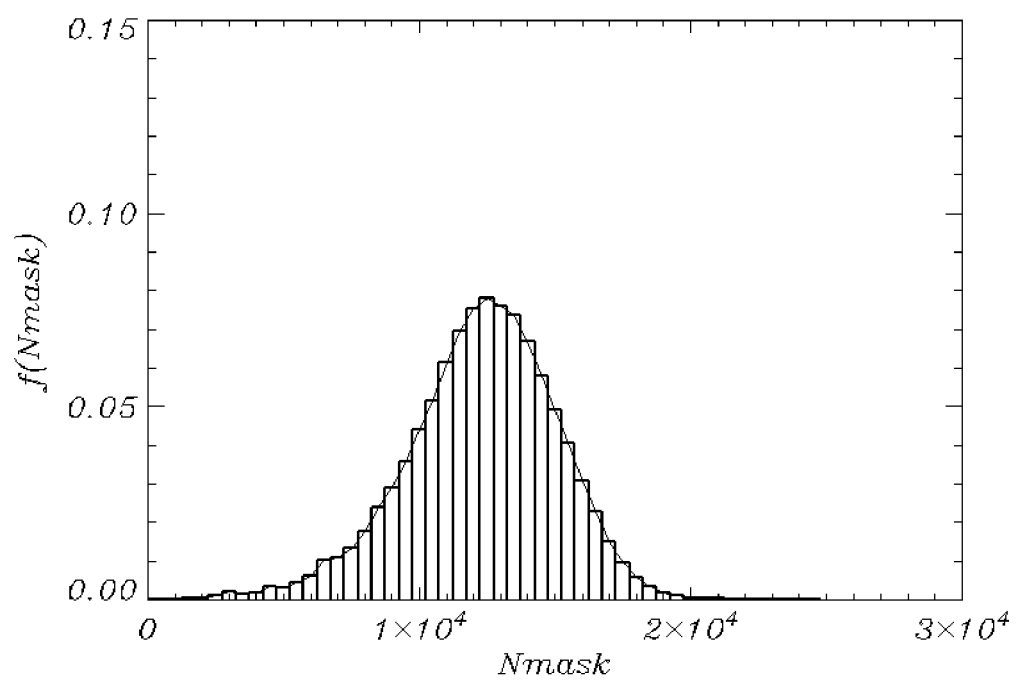
FIG. 19 is a graph of an example statistical distribution of the area of the breech face for 9 mm cartridge cases.

FIG. 19 shows the histogram of area A of the breech face region of interest for a set of 9 mm cartridge cases. In this particular example, it is found that this statistical distribution has a large standard deviation with respect to the mean. This implies that score normalization is relevant even for the analysis of this single caliber.

Figure 20A:
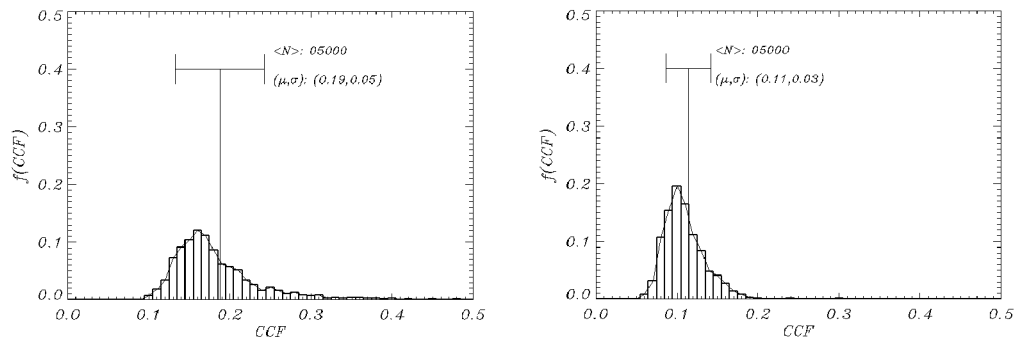
FIGS. 20A-20C are graphs of an example statistical distribution of the CCFMax, with and without score correction for non-match cartridge cases fired from 9 mm caliber firearm for three intervals of sizes of the region of interest.
Figure 20B:
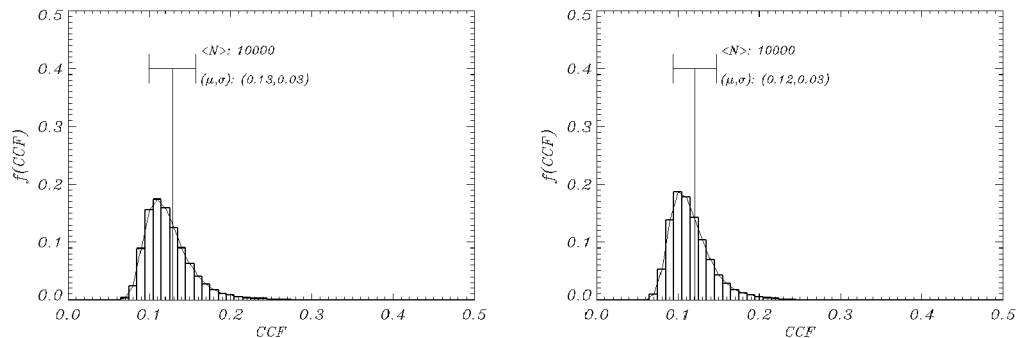
Figure 20C:
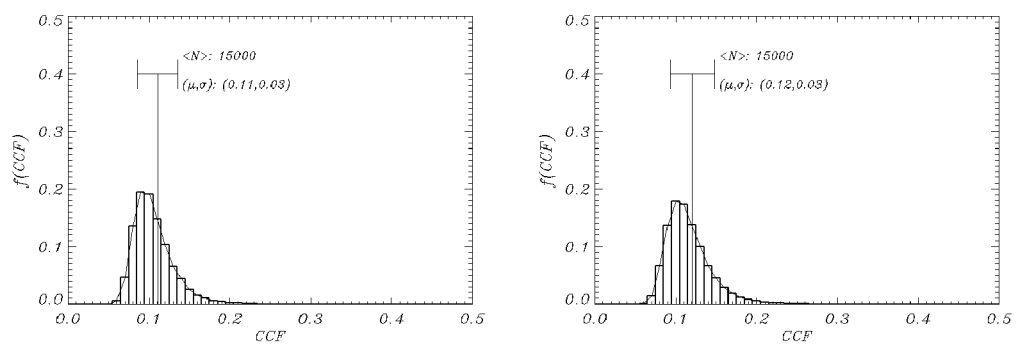

The score correction methodology discussed above can then be applied. The reference area ($A_0$) is defined as 10,000 pixels in this example. FIGS. 20A-20C show the changes in the non-match score distribution induced by the score correction process for three subsets of cartridge cases parameterized by an interval of area A in pixel. The score distribution of every subset becomes identical within reasonable random fluctuations.

The score correction methodology can also be applied to BF score for cartridge cases with a noncircular FP, for example Glock cartridge cases characterized by an elliptical FP. It is also applicable to scores computed for the FP region of interest, where the relevant area is the area of the FP region.

Figure 21:
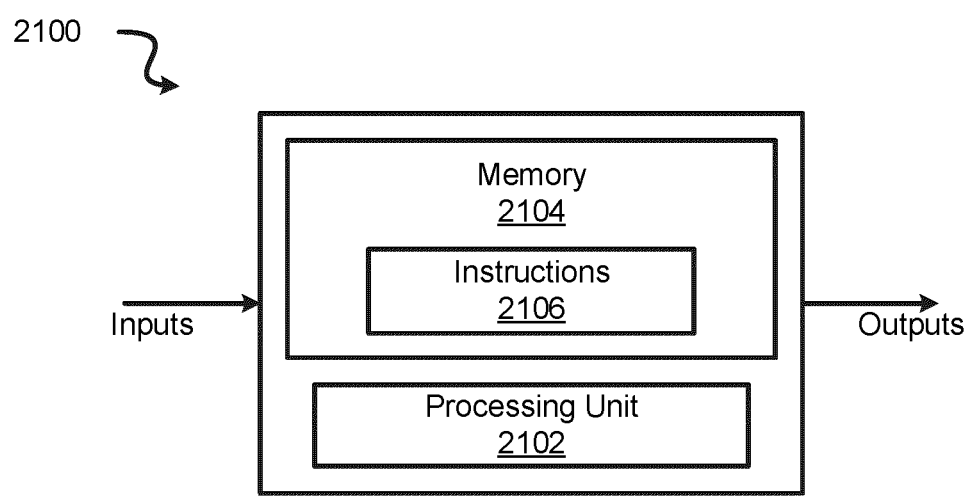
FIG. 21 is a block diagram of an example computing device.

In some embodiments, the method 100 is implemented in one or more computing devices 2100, as illustrated in FIG. 21. For simplicity only one computing 2100 is shown but the system may include more computing devices 2100 operable to exchange data. The computing devices 2100 may be the same or different types of devices.

The computing device 2100 comprises a processing unit 2102 and a memory 2104 which has stored therein computer-executable instructions 2106. The processing unit 2102 may comprise any suitable devices configured to implement the method 100 such that instructions 2106, when executed by the computing device 2100 or other programmable apparatus, may cause the functions/acts/steps performed as part of the method 100 to be executed. The processing unit 2102 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 2104 may comprise any suitable known or other machine-readable storage medium. The memory 2104 may comprise non-transitory computer readable storage medium, for example, but not limited to, an electronic, magnetic, optical, electromagnetic, infrared, or semiconductor system, apparatus, or device, or any suitable combination of the foregoing. The memory 2104 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 2104 may comprise any storage means (e.g., devices) suitable for retrievably storing machine-readable instructions 2106 executable by processing unit 2102.

The method 100 for determining a similarity measure as described herein may be implemented in a high level procedural or object oriented programming or scripting language, or a combination thereof, to communicate with or assist in the operation of a computer system, for example the computing device 2100. Alternatively, the method 100 for determining a similarity measure may be implemented in assembly or machine language. The language may be a compiled or interpreted language. Program code for implementing the methods and systems may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or more specifically the processing unit 2102 of the computing device 2100, to operate in a specific and predefined manner to perform the functions described herein, for example those described in the method 100.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the similarity score may be for a given region of interest of two ballistic specimens or for the entire specimens. Yet further modifications could be implemented by a person of ordinary skill in the art in view of the present disclosure, which modifications would be within the scope of the present technology.

The invention claimed is:

1. A method for determining a similarity or distance measure between a first ballistic specimen and a second ballistic specimen, the method comprising:
acquiring topographic data from the first ballistic specimen and the second ballistic specimen of at least one region of interest;
computing from the topographic data at least one similarity score s for the first ballistic specimen and the second ballistic specimen;
determining a non-match probability measure of the similarity score for at least one parameter characterizing a macroscopic and/or microscopic feature of the topographic data, the non-match probability measure associating the first ballistic specimen and the second ballistic specimen to a different source; and
correcting the similarity score by determining a corrected similarity score that yields a same value of the non-match probability measure as the similarity score for a reference value of the at least one parameter.

2. The method of claim 1, wherein the reference value is a mean of the at least one parameter for a given type of ballistic specimen.

3. The method of claim 1, wherein the at least one parameter is at least one of a length L of the region of interest and a roughness R of a surface of the region of interest.

4. The method of claim 3, wherein the roughness R is an absolute profile slope between peaks and valleys of the region of interest.

5. The method of claim 1, wherein the similarity score is a maximum value of a cross-correlation function for a first profile X associated with the first ballistic specimen and a second profile Y associated with the second ballistic specimen.

6. The method of claim 1, wherein the similarity score is at least one of a pattern matching score (PMS) and a line counting score (LCS).

7. The method of claim 1, wherein the non-match probability measure is a false match rate (FMR).

8. The method of claim 1, further comprising selecting the at least one parameter from a list of parameters.

9. The method of claim 1, wherein the at least one parameter is at least one area A of the region of interest.

10. The method of claim 1, wherein the similarity score is a maximum value of an areal cross-correlation function for a first area X associated with the first ballistic specimen and a second area Y associated with the second ballistic specimen.

11. A system for determining a similarity or distance measure between a first ballistic specimen and a second ballistic specimen, the system comprising:
at least one processor; and
a non-transitory computer-readable medium having stored thereon program instructions executable by the at least one processor for:
acquiring topographic data from the first ballistic specimen and the second ballistic specimen of at least one region of interest;
computing from the topographic data at least one similarity score s for the first ballistic specimen and the second ballistic specimen;
determining a non-match probability measure of the similarity score for at least one parameter characterizing a macroscopic and/or microscopic feature of the topographic data, the non-match probability measure associating the first ballistic specimen and the second ballistic specimen to a different source; and
correcting the similarity score by determining a corrected similarity score that yields a same value of the non-match probability measure as the similarity score for a reference value of the at least one parameter.

12. The system of claim 11, wherein the reference value is a mean of the at least one parameter for a given type of ballistic specimen.

13. The system of claim 11, wherein the at least one parameter is at least one of a length L of the region of interest and a roughness R of a surface of the region of interest.

14. The system of claim 13, wherein the roughness R is an absolute profile slope between peaks and valleys of the region of interest.

15. The system of claim 11, wherein the similarity score is a maximum value of a cross-correlation function for a first profile X associated with the first ballistic specimen and a second profile Y associated with the second ballistic specimen.

16. The system of claim 11, wherein the similarity score is at least one of a pattern matching score (PMS) and a line counting score (LCS).

17. The system of claim 11, wherein the non-match probability measure is a false match rate (FMR).

18. The system of claim 11, wherein the program instructions are further executable for selecting the at least one parameter from a list of class C characteristics and roughness parameters R.

19. The system of claim 11, wherein the at least one parameter is at least one of an area A of the region of interest.

20. The system of claim 11, wherein the similarity score is a maximum value of an areal cross-correlation function for a first area X associated with the first ballistic specimen and a second area Y associated with the second ballistic specimen.

* * * * *